US011327381B2

(12) United States Patent
Uetsuka

(10) Patent No.: US 11,327,381 B2
(45) Date of Patent: May 10, 2022

(54) LIGHT BEAM SWITCHING ELEMENT, ASSEMBLY OF SAME, AND CONTROL METHOD FOR SAME

(71) Applicant: NATIONAL INSTITUTE OF ADVANCED INDUSTRIAL SCIENCE AND TECHNOLOGY, Tokyo (JP)

(72) Inventor: Hisato Uetsuka, Ibaraki (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 19 days.

(21) Appl. No.: 17/425,239

(22) PCT Filed: Mar. 25, 2019

(86) PCT No.: PCT/JP2019/012515
§ 371 (c)(1),
(2) Date: Jul. 22, 2021

(87) PCT Pub. No.: WO2019/182158
PCT Pub. Date: Sep. 26, 2019

(65) Prior Publication Data
US 2022/0091456 A1 Mar. 24, 2022

(30) Foreign Application Priority Data
Mar. 23, 2018 (JP) ............................. JP2018-055978

(51) Int. Cl.
*G02F 1/137* (2006.01)
*G02F 1/13363* (2006.01)
*G02F 1/1335* (2006.01)

(52) U.S. Cl.
CPC .... *G02F 1/13775* (2021.01); *G02F 1/133528* (2013.01); *G02F 1/133553* (2013.01); *G02F 1/133638* (2021.01)

(58) Field of Classification Search
CPC .................................................. G02F 1/13775
See application file for complete search history.

(56) References Cited

U.S. PATENT DOCUMENTS

2012/0188467 A1* 7/2012 Escuti ................... G02F 1/1347
349/1
2020/0319388 A1* 10/2020 Ambur ..................... G02B 1/14

FOREIGN PATENT DOCUMENTS

JP 2014-186045 A 10/2014

OTHER PUBLICATIONS

Zichen Zhang et al., "Fundamentals of phase-only liquid crystal on silicon (LCOS) devices", Light: Science & Applications (2014) 3, e213; doi:10.1038/lsa.2014.94; published online, Oct. 24, 2014, pp. 1-10.

(Continued)

*Primary Examiner* — Edmond C Lau
(74) *Attorney, Agent, or Firm* — Taro Yaguchi

(57) ABSTRACT

[Problem] Conventional multi-stage optical switching elements have had the problems that, when the number of polarized light beams becomes large, walkoff of light beams produced in middle stages is gradually amplified so that beams at the terminal end deviate from the opening surface and the configuration of the optical switching element itself becomes larger. [Solution] Developed is a 1×N light beam switching element, which has a cube-type modular structure comprising a corner cube and a cubical cube with roughly identical dimensions, which is one-dimensional, two-dimensional, and three-dimensional, and which is fast, highly efficient, wide-angled, and compact, by combining: a simple corner-cube reflection-type light beam switching element (Continued)

comprising a polymer-stabilized blue-phase liquid crystal layer sandwiched between two transparent electrodes in the form of parallel plates, a mirror, and a wedge-shaped prism; and a walkoff correction element in which a condensing-type polarization grating is arranged or affixed to a cubical.

17 Claims, 23 Drawing Sheets

(56) References Cited

OTHER PUBLICATIONS

Jihwan Kim et al., "Fabrication of ideal geometric-phase holograms with arbitrary wavefronts", Optica, vol. 2, No. 11, Nov. 2015, pp. 958-964.

* cited by examiner

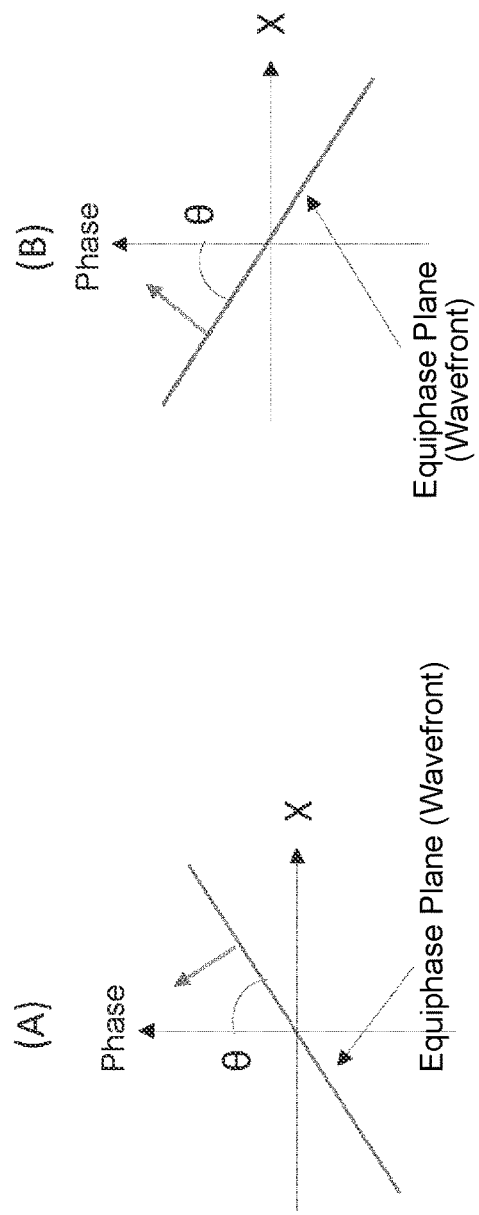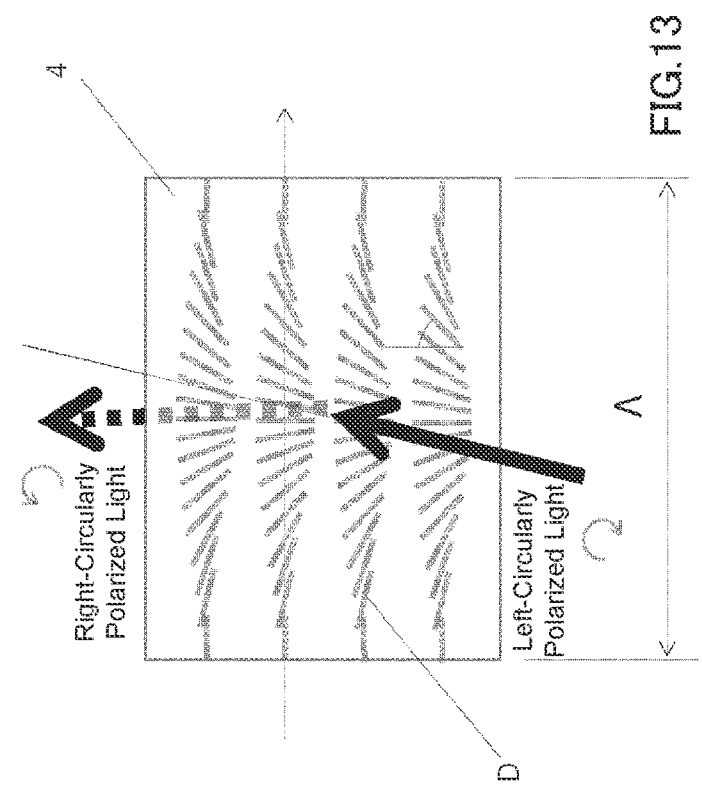
FIG. 13

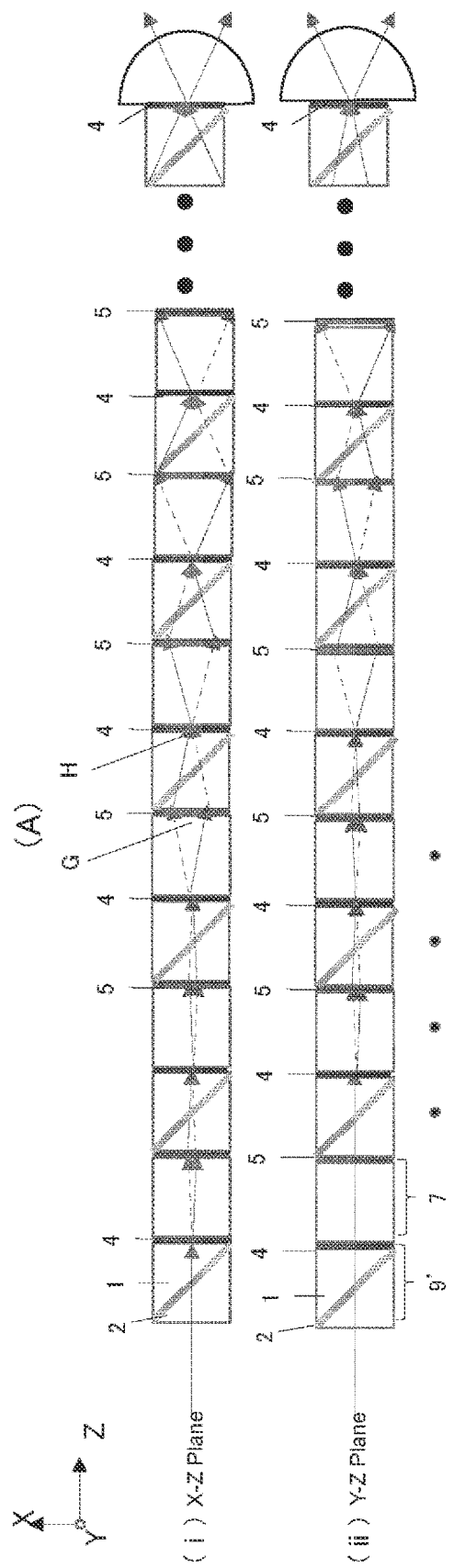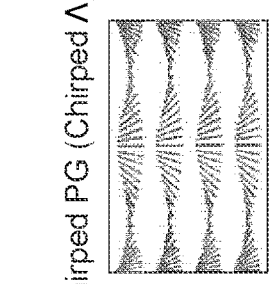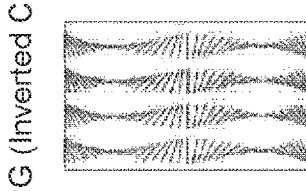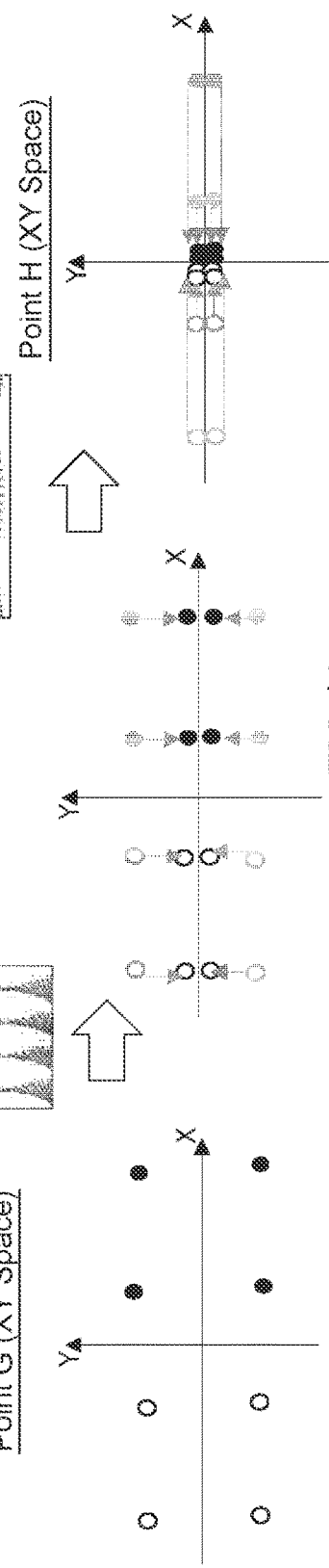
FIG.19

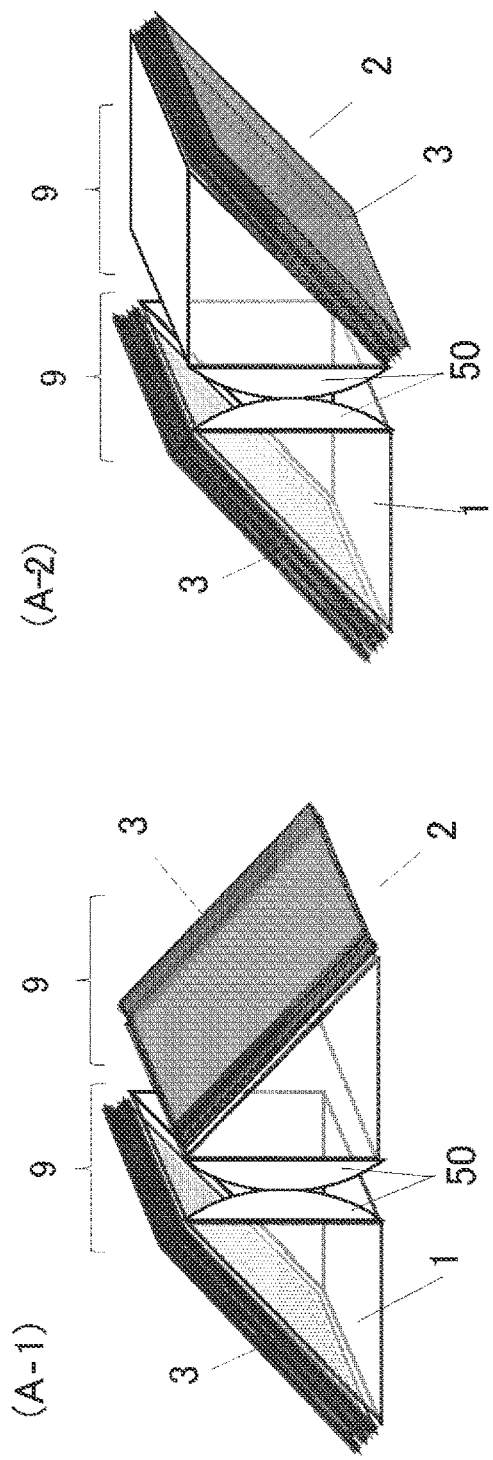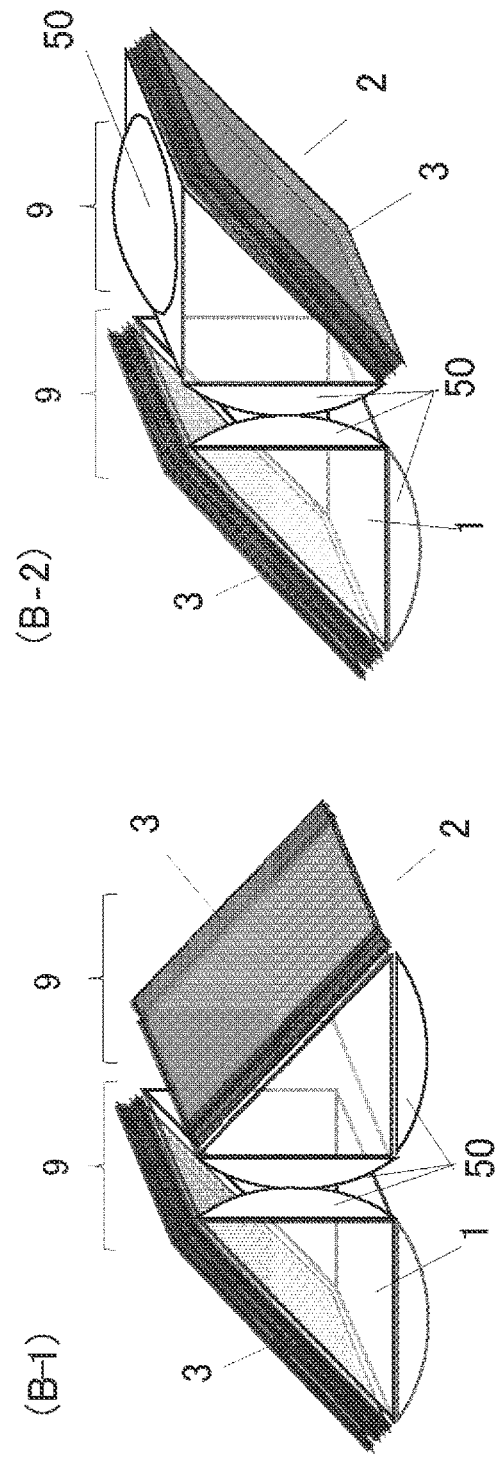
FIG.23

LIGHT BEAM SWITCHING ELEMENT, ASSEMBLY OF SAME, AND CONTROL METHOD FOR SAME

FIELD OF THE INVENTION

The present invention relates to an optical beam switching element, an assembly of the same, and a method of controlling the same.

BACKGROUND OF THE INVENTION

FIG. 1 is an example of a conventional liquid crystal phase panel (Non-Patent Document 1). In this panel, nematic liquid crystal 12 is inserted between two parallel plate electrodes 11. The liquid crystal phase panel uses zero-twisted ECB (electrically controlled birefringence), and, when voltage is not applied to the two parallel plate electrodes, the director of the liquid crystal is arrayed parallel to the plate electrodes, and incident light is subjected to retardation.

By using a desired thickness of liquid crystal in the liquid crystal phase panel, it is possible to cause the panel to act, for example, as a half-wave plate. Meanwhile, when voltage is applied to the two parallel plate electrodes, the electric field becomes orthogonal to the plate electrodes, and the director of the liquid crystal also becomes orthogonal in conformance with the electric field. Incoming light is not subjected to retardation, and the liquid crystal acts as an isotropic medium. Conventional nematic liquid crystal of this sort is widely used in displays, but has a slow switching speed of milliseconds, and cannot be employed in uses that require fast switching speeds.

Thus, the used of polymer-stabilized blue phase liquid crystal capable of high-speed switching in liquid crystal panels has been studied. This liquid crystal takes advantage of the Kerr effect, and, when voltage is not applied to the electrodes 25 in FIG. 2, index ellipsoids 27 of blue phase liquid crystal 26 are spherical, and retardation does not occur at any light input angle (FIG. 2(A)).

Meanwhile, when voltage is applied to the electrodes 25, the index ellipsoids 27 of the blue phase liquid crystal 26 become ellipsoids the major axes of which are in the electrode direction. Thus, when light enters the substrate 24 orthogonally, no retardation occurs as the cross sections of the index ellipsoids 27 are circular (FIG. 2(B)). For this reason, an electric field that is parallel to the plate electrodes must be generated to produce retardation in the blue phase liquid crystal 26.

To this end, comb-teeth electrodes such as shown in FIG. 3, which are used in IPS (in-plane switching), have been studied. In these electrodes, positive and negative or positive and 0 voltages are applied to adjacent comb-teeth electrodes 21 to generate an electric field in the lateral direction.

However, a large electric field distribution (a non-uniform electric field) is produced within the polymer-stabilized blue-phase liquid crystal 22, with an especially large electric field being generated near the comb-teeth electrodes 21, and electrostriction results in degradation of the switching speed of the polymer-stabilized blue-phase liquid crystal 22. Moreover, an especially large thickness of liquid crystal is required at long wavelengths, generating a progressively large electric field distribution within the liquid crystal. Thus, using comb-teeth electrodes 21 results in a large in-plane electric field distribution, leading in a phase distribution (non-uniformity of phase) within the outgoing optical beam, and causing various types of degradation in performance, such as loss and crosstalk.

An example has been reported in which, in order to create such an arrangement, prism sheets are used along with polymer-stabilized blue phase liquid crystal, and the display is driven using a conventional orthogonal electric field to obtain gradient properties from which hysteresis has been removed (Patent Document 1, FIG. 4). However, while this structure is effective in the case of orthogonal incoming light, when the incoming light enters at a large oblique angle, the optically refractive effects of the prism sheets become non-uniform within the light beam, resulting in a large phase distribution within the outgoing light beam.

Meanwhile, an optical switching engine using ordinary nematic liquid crystal and polarization gratings as shown in FIG. 5 has been reported. This engine comprises a phase plate (LC half-wave plate) and a polarization grating (passive PG) bonded together, and assumes that incoming light will enter the two substantially orthogonally.

This structure is effective when used with a phase plate that utilizes ordinary nematic liquid crystal (LC half-wave plate), an IPS (in-plane switching) type phase plate that utilizes polymer-stabilized blue phase liquid crystal, or a polymer-stabilized blue phase liquid crystal phase plate that utilizes prism sheets, but results in major degradation in properties such as switching speed, optical beam phase distribution, and so forth in all cases, as discussed above.

Moreover, this structure has a disadvantage in that, when the deflection angle of the optical beam increases, total internal reflection occurs at the interface between the passive PG (index of refraction: 1.5) and air (index of refraction: 1), making it impossible to extract light.

PRIOR ART LITERATURE

Patent Literature

Patent Document 1: Japanese Laid-Open Patent Publication No. 2014-186045
Patent Document 2: US Application Publication No. 2012/0188467

Non-Patent Literature

Non-Patent Document 1: "Fundamentals of phase-only liquid crystal on silicon (LCOS) devices", Zichen Zhang et al. (Light: Science & Applications (2014), p. 16)
Non-Patent Document 2: Optica, "Fabrication of ideal geometric-phase holograms with arbitrary wavefront", Jihwan Kim, et al., vol. 2, No. 11, November 2015, Optical Society of America

SUMMARY OF THE INVENTION

To summarize the foregoing discussion, the prior art presents the following problems.

(1) IPS (in-plane switching) comb-teeth electrodes generate a large electric field distribution within the liquid crystal, with a large electric field being generated near the electrodes, and electrostriction results in degradations in the switching speed of polymer-stabilized blue-phase liquid crystal.

(2) An especially large thickness of liquid crystal is required at long wavelengths, generating a progressively larger electric field distribution within the liquid crystal.

(3) There is also a large in-plane electric field distribution, resulting in a phase distribution within the outgoing light beam, and causing various types of degradation in performance, such as loss and crosstalk.

(4) In the structure in Patent Document 1, the optically refractive effects of the prism sheets become non-uniform within the light beam when incoming light enters the blue-phase liquid crystal at a highly oblique angle, resulting in a large phase distribution within the outgoing light beam.

(5) The structure in Patent Document 2 comprises phase plates (LC half-wave plates) and polarization gratings (passive PGs) bonded together, and assumes that incoming light will enter the structure substantially orthogonally. Accordingly, this structure is effective when used with a phase plate that utilizes ordinary nematic liquid crystal (LC half-wave plate), an IPS (in-plane switching) type phase plate that utilizes polymer-stabilized blue phase liquid crystal, or a polymer-stabilized blue phase liquid crystal phase plate that utilizes prism sheets, but results in major degradation in optical switching engine properties such as switching speed, loss, crosstalk, and so forth in all cases, as discussed above.

(6) In addition, because the structure in Patent Document 2 is a flat-surfaced structure of stacked plates, the total internal reflection produced by the difference in indexes of refraction between the material and the air at the output face at large deflection angles precludes the extraction of light to the exterior.

(7) Moreover, as the number of optical beams to be deflected increases, the thickness of the stacked substrates also increases, thereby increasing the walk-off described below and markedly degrading performance.

Thus, an object of the present invention is to solve the problems described above and achieve an optical beam switching element that is capable of high-speed, wide-angle switching.

In order to solve the problems described above, the present invention is directed to an optical beam switching element for switching an incoming optical beam, comprising: a columnar sloped member made of a light-transmissive material comprising a first planar face, a second planar face orthogonal to the first planar face, and a sloped face that is sloped with respect to the first planar face and the second planar face; a polarization switching element, the rear surface of which is mounted to the sloped face; a mirror mounted to a front surface of the polarization switching element; and a polarization grating mounted to the second planar face, wherein the polarization switching element comprises polymer-stabilized blue phase liquid crystal sandwiched between a pair of transparent electrodes, and wherein the polarization grating comprises a director that produces birefringence.

In accordance with the optical beam switching element of the present invention, polymer-stabilized blue phase liquid crystal is used as liquid crystal, enabling utilization in applications calling for high switching speeds. In addition, the polarization grating is mounted to the second planar face, thereby facilitating the irradiation of the element with an orthogonal optical beam. As used herein, the term "orthogonal" as used in connection with the relationship between the first planar face and the second planar face encompasses, in addition to a literal 90° arrangement, angular changes within a range of ±5°. As used herein, the concept of "mounted" encompasses anchoring through bonding or the like, as well as cases in which the polarization grating is disposed and sandwiched between the sloped member and another member.

In addition, in the optical beam switching element according to the present invention, the optical beam switching element may act as a half-wave plate upon an incoming optical beam. Such an arrangement makes it possible to output an optical beam having the inverse phase of the inputted beam.

In addition, in the optical beam switching element of the present invention, a columnar correction element may be mounted to the optical beam switching element, wherein the columnar correction element may be provided with an element body made of a light-transmissive material, comprising a mounting face mounted to the face on which the polarization grating is mounted, and a light-emitting face that is parallel to the mounting face, and a focusing polarization grating having a focusing director that produces birefringence on the light-emitting face to focus light.

In this arrangement, a correction element is provided on the face of the optical beam switching element to which the polarization grating is mounted, thus making it possible to focus the diffuse optical beam exiting the polarization grating. This makes it possible to prevent walk-off, the diffusion and divergence of the optical beam.

In addition, in the optical beam switching element of the present invention, the focusing polarization grating may be formed so that the wavelength of the focusing director is such that the angle of the incoming optical beam and the angle of the outputted optical beam are symmetrical. Such an arrangement makes it possible to reliably focus diffused optical beams.

In addition, in the optical beam switching element of the present invention, the focusing director may be formed such that it has a wavelength that yields half-wave plate functionality at a reference position, and the period thereof gradually shortens symmetrically outward from the reference position. In such an arrangement, the period of the focusing director varies in a "chirped" manner, making it possible to reliably focus diffused optical beams.

In addition, in the optical beam switching element of the present invention, a non-reflective coating may be formed on the faces through which the optical beam passes. Such an arrangement makes it possible to prevent loss caused by reflection with the optical beam passes through the various faces.

In addition, in the optical beam switching element of the present invention, the mirror may be a multi-layer film dielectric mirror or a metal mirror. In such an arrangement, the mirror has high reflectivity, making it possible to minimize loss when an optical beam is reflected by the mirror.

Furthermore, an assembly constituted by a combination of multiple ones of the optical beam switching element of the present invention is an optical beam switching element assembly comprising a first set of optical beam switching elements formed by said ones of optical beam switching elements, and an $M^{th}$ set of the optical beam switching elements (wherein M is an integer of at least 2) coupled to the first set of optical beam switching elements, wherein coupling is performed by mounting the first planar face on the coupling side to the light-emitting face on the receiving side, and wherein the assembly is formed so that the wavelength of the director of the $M^{th}$ set of optical beam switching elements is $\frac{1}{2}^{M-1}$ the wavelength of the director of the first set of optical beam switching elements.

In such an arrangement, a plurality of optical beam switching elements are combined, and the wavelength of the director of the $M^{th}$ set of optical beam switching elements is set to $\frac{1}{2}^{M-1}$, thereby facilitating the formation of 1×N optical beam switching elements (wherein N is $2^M$).

Furthermore, an optical beam switching element assembly of the present invention is an optical beam switching element assembly comprising a first set of optical beam switching elements formed by said ones of optical beam switching elements, and an $M^{th}$ set of the optical beam switching elements (wherein M is an integer of at least 2) coupled to the first set of optical beam switching elements, wherein coupling is performed by mounting the first planar face on the coupling side to the light-emitting face on the receiving side; and wherein the assembly is planarly arrayed in a plane XY in an XYZ coordinate system.

Such an arrangement makes it possible to planarly combine a plurality of optical beam switching elements, which is effective when there is little room in the Z-direction.

Furthermore, an optical beam switching element assembly of the present invention is an optical beam switching element assembly comprising a first set of optical beam switching elements formed by said ones of optical beam switching elements, and an $M^{th}$ set of the optical beam switching elements (wherein M is an integer of at least 2) coupled to the first set of optical beam switching elements, wherein coupling is performed by mounting the first planar face on the coupling side to the light-emitting face on the receiving side, and wherein the first set of optical beam switching elements is disposed in plane XY in a XYZ coordinate system, and wherein the second set of optical beam switching elements is raised from plane XY in the Z-direction.

Such an arrangement makes it possible to three-dimensionally combine a plurality of optical beam switching elements, which is effective when there is little room in the horizontal direction.

In addition, in the optical beam switching element assembly of the present invention, the mounting face and the light-emitting face of the correction element may be orthogonally disposed, the element body may be provided with a correction sloped face that is sloped with respect to the mounting face and the light-emitting face, the focusing polarization grating may be mounted to the correction sloped face, and a correction mirror may be mounted to the front surface of the focusing polarization grating.

In such an arrangement, the correction element is reflective, making it possible to bend the path of the optical beam, and can be combined with a transmissive correction element to create a desired path for the optical beam.

In addition, in the optical beam switching element assembly of the present invention, lens-type correction elements constituted by a pair of convex lenses with abutting convex surfaces may be disposed on the mounting face and the light-emitting face in place of the correction element. Such an arrangement also makes it possible to form an optical beam switching element assembly having the desired optical beam path.

In addition, in the optical beam switching element assembly of the present invention, the convex lenses may be formed in semicylindrical shapes. Such semicylindrical convex lenses also make it possible to form an optical beam switching element assembly having the desired optical beam path.

Meanwhile, the optical beam switching element of the present invention may also be an optical beam switching element for switching an incoming optical beam comprising: a columnar sloped member made of a light-transmissive material comprising a first planar face, a second planar face parallel to the first planar face, and a sloped face that is disposed between the first planar face and the second planar face and is sloped with respect to the first planar face and the second planar face; a polarization switching element mounted to the sloped face; and a polarization grating mounted to the second planar face, wherein the polarization switching element comprises polymer-stabilized blue phase liquid crystal sandwiched between a pair of transparent electrodes, and wherein the polarization grating comprises a director that produces birefringence. Such an arrangement makes it possible to provide an optically transmissive optical beam switching element wherein the optical beam is not bent by reflection.

In addition, in the transmissive optical beam switching element of the present invention, the optical beam switching element may act as a half-wave plate upon an incoming optical beam. Such an arrangement makes it possible to output an optical beam having the inverse phase of the inputted beam.

In addition, in the transmissive optical beam switching element, a columnar correction element may be mounted to the optical beam switching element, wherein the columnar correction element may be provided with an element body made of a light-transmissive material, comprising a mounting face mounted to the face on which the polarization grating is mounted, and a light-emitting face that is parallel to the mounting face, and a focusing polarization grating having a focusing director that produces birefringence on the light-emitting face to focus light.

In this arrangement, a correction element is provided on the face of the optical beam switching element to which the polarization grating is mounted, thus making it possible to focus the diffuse optical beam exiting the polarization grating. This makes it possible to prevent walk-off, the diffusion and divergence of the optical beam.

In addition, in a method of controlling the optical beam switching element, an inversion process that inverts the polarity of the voltage applied to the transparent electrode is performed. Such an arrangement makes it possible to prevent image persistence in the blue phase liquid crystal.

In the present invention, the following technical solutions are employed.

(1) Polymer-stabilized blue phase liquid crystal is used as the liquid crystal material. The polymer-stabilized blue phase liquid crystal is liquid crystal constituted by photonic crystals, and enables higher speeds than ordinary nematic liquid crystal.

(2) The major axes of the index ellipsoids of the polymer-stabilized blue phase liquid crystal are in the direction of the applied electric field, as shown in FIG. 6. Therefore, in order to change the polarization of the optical beam, the beam is directed at an angle to these major axes. Using simple parallel plate electrodes as shown in FIG. 6, a structure in which the electrodes are sandwiched against a wedge-shaped prism is formed to make a structure in which light can be directed toward the blue phase liquid crystal layer at an angle.

(3) Because loss increases when the incident optical beam is at an angle, a structure in which the polarization grating 4 is disposed on or bonded to a non-sloped face of a cube (sloped member) is used to ensure that the incident beam is as orthogonal as possible.

(4) The switch (optical beam switching element) is based on the principle that a single optical beam switches in two directions depending on the rotation direction of circularly polarized light. Therefore, light is switched using a power of 2. Consequently, the optical beam at the end deviates from the center (walk-off), and a wide-angled optical beam diverges from the light-emitting face of the cube, as shown in FIG. 7(A).

In order to avoid this, a walk-off correction cube 70 constituted by a focusing polarization grating 5 that focuses the outputted optical beam disposed on or bonded to a cube is disposed after a reflective optical beam switching element (depicted as transmissive here) in the present invention, as shown in FIG. 7(B), to cancel out walk-off of the right-angle-reflected optical beam, and this is repeated to yield zero total walk-off.

(5) As shown in FIG. 8(A), the switch exhibits the problem of high transmission loss on the output side due to the effects of Snell's law between the material of the cube and the air if the optical beam has a high angle of diffusion, and, in the worst cases, an inability to extract light due to total internal reflection at the boundary. Therefore, a structure in which a lens is disposed on or bonded to the output end surface has been employed (FIG. 8(B)).

(6) The 1×N optical beam switching elements comprise a walk-off correction cube 70 disposed or bonded to the rear of a right-angle-reflecting optical beam switching element. This results in comparatively large dimensions. Therefore, the reflection direction of the right-angle-reflected optical beam is altered as shown in FIG. 24 to create a three-dimensional structure and obtain more compact dimensions.

Specifically, the present invention is capable of providing the following means.

(1) A reflective optical beam switching element characterized in that:

a polarization switching element having a structure comprising polymer-stabilized blue phase liquid crystal sandwiched between two substrates on which are formed transparent electrodes is disposed on or bonded to a sloped face of a corner cube obtained by dividing a cube formed from a light-transmissive material along its hypotenuse;

a mirror is further disposed on or bonded to the polarization switching element to form a reflective polarization switching element;

a polarization grating in which the director of birefringence rotates at a given period $\nabla 1$ and which operates as a half-wave plate at points including the director is disposed on or bonded to one square side surface of the reflective polarization switching element; and when an optical beam of circularly polarized light enters another square side surface of the reflective polarization switching element, the beam is reflected by the mirror and passes through the polarization switch twice, then passes through the polarization grating, and is switched according to the direction of the circularly polarized light and outputted.

(2) A 1×2 optical beam switching element characterized in that:

a focusing polarization grating is disposed on or bonded to one side surface of a cube having substantially the same dimensions as the cube to form a walk-off correction element; and the walk-off correction element is further disposed on or bonded to the reflective optical beam switching element according to (1) so that another side surface opposes the polarization grating and the one side surface.

(3) The 1×2 optical beam switching element according to (2), wherein the focusing polarization grating is a chirped polarization grating that has a birefringent director and forms a half-wave plate at locations, the director rotating at a given period so as to have mirror symmetry with respect to a given central axis, and the period $\nabla'$ thereof varies in a chirped manner so that the period $\nabla'$ thereof gradually shortens outward from the center.

(4) A one-dimensional 1×4 optical beam switching element characterized by a 1×2 optical beam switching element, configured similarly to the 1×2 optical beam switching element according to (3), that utilizes a polarization grating having a birefringent director that rotates at a period $\nabla 2$ that is substantially half of period $\nabla 1$ being disposed or bonded to the rear of the 1×2 optical beam switching element according to (3).

(5) A one-dimensional 1×N optical beam switching element characterized by being achieved by further disposing or bonding a 1×2 optical beam switching element, configured similarly to the 1×4 optical beam switching element according to (4), that utilizes a polarization grating having a birefringent director that rotates at a period $\nabla 3$ that substantially half of period $\nabla 2$, and repeating the same process L times (wherein L is 0 or a natural number equal to or greater than 1), wherein N=$2^n$".

(6) A one-dimensional 1×N optical beam switching element constituted by the 1×N optical beam switching element according to (4) or (5) (N=$2^{L+2}$), wherein the polarization grating of the 1×2 optical beam switching element upon which the optical beam is incident has low deflection.

(7) A two-dimensional 1×N optical beam switching element characterized by a plurality of the 1×2 optical beam switching element according to (3) being used, the deflection direction of the optical beam being alternately deflected along axes orthogonal to the X-direction (horizontal direction) and the Y-direction (vertical direction), and the optical beam as a whole being switched in a two-dimensional plane, wherein N is a power of 2.

(8) The two-dimensional 1×N optical beam switching element according to (7), wherein the focusing polarization grating forming part of the walk-off correction element is formed by layering the chirped polarization grating and a lens polarization grating wherein the director of the polarization grating rotates at a given period around a given point so as to have point symmetry, and the period $\nabla'$ thereof varies in a chirped manner so that the period $\nabla'$ gradually shortens outward from the center.

(9) The two-dimensional 1×N optical beam switching element according to either of (7) or (8), wherein the 1×2 optical beam switching elements having small deflection angles in the X-direction and the Y-direction from the input direction of the optical beam are connected in alternation, and the deflection angles thereof in both the X-direction and the Y-direction approximately double as the next stage is approached.

(10) The 1×N optical beam switching element according to any of (5), (6), and (9), wherein the element further comprises a walk-off correction cube constituted by a reflective mirror, a corner cube, and the focusing polarization grating, the 1×2 optical beam switching elements are replaced, as appropriate, with the walk-off correction element formed from the cube, and the reflective optical beam switching element is three-dimensionally disposed.

(11) A 1×N optical beam switching element characterized in that:

the walk-off correction element of the preceding 1×2 optical beam switching element in the 1×N optical beam switching element according to any of (5), (6), and (9) is formed by disposing or bonding a convex lens on or to the light-emitting face of the reflective beam switching element; and a convex lens is disposed on or bonded to the light-receiving face of the reflective optical beam switching element of the following 1×2 optical beam switching element, and the reflective optical beam switching element is disposed three-dimensionally.

(12) The 1×N optical beam switching element according to (11), wherein a convex lens is further disposed on or bonded to the light-receiving face of the reflective optical beam switching element forming part of the preceding walk-off correction element, a convex lens is disposed on or bonded to the light-emitting face of the reflective optical beam switching element of the following 1×2 optical beam switching element, and the reflective optical beam switching elements are disposed three-dimensionally.

(13) The 1×N optical beam switching element according to (12), wherein a substantially hemispherical lens is disposed on or bonded to the last optical-beam-outputting face.

(14) The 1×2 optical beam switching element according to (2), wherein glass or silicon is used for the corner cube and the cube forming part of the walk-off correction element.

(15) The 1×2 optical beam switching element according to (14), wherein a non-reflective coating is formed on the faces through which the optical beam passes.

(16) The reflective optical beam switching element according to (1), wherein the mirror is a multi-layer film dielectric mirror or a metal mirror.

(17) The 1×N optical beam switching element according to any of (5), (6), and (9), wherein the polarity of the voltage applied to the transparent electrodes of the polarization switching elements is alternately inverted over time.

In accordance with the present invention, an optical beam switching element having a cube-type modular structure that is high-speed, high-efficiency, wide-angle, and compact can be provided.

BRIEF DESCRIPTION OF THE DRAWINGS

FIG. 2(A) depicts index ellipsoids showing the isotropic properties of the polymer-stabilized blue-phase liquid crystal when voltage is not being applied thereto, and FIG. 2(B) depicts the index ellipsoids of the polymer-stabilized blue-phase liquid crystal when voltage is applied thereto.

FIGS. 10(A) and (B) are illustrations of the path of an optical beam in the X-Z plane and the Y-Z plane.

FIGS. 13(A) and (B) are illustrations of the phase distribution and the output angle of the optical beam in the X-axial direction (the direction in which the director rotates) when left-circularly polarized light enters the polarization grating 4.

FIG. 19(A) is a schematic illustration of the two-dimensional 1×N optical beam switching element depicted in FIG. 10 represented in transmissive form, and FIG. 19(B) is an illustration of a technique for a focusing 2D_PG needed to focus, at point H, the XY spatial distribution of light at point G in FIG. 19(A).

FIGS. 23(A-1), (A-2), (B-1), and (B-2) are illustrations of actual structures for achieving the arrangements shown in FIG. 21(Bb) and (C).

DETAILED DESCRIPTION OF THE INVENTION

Example 1

Figure 9:
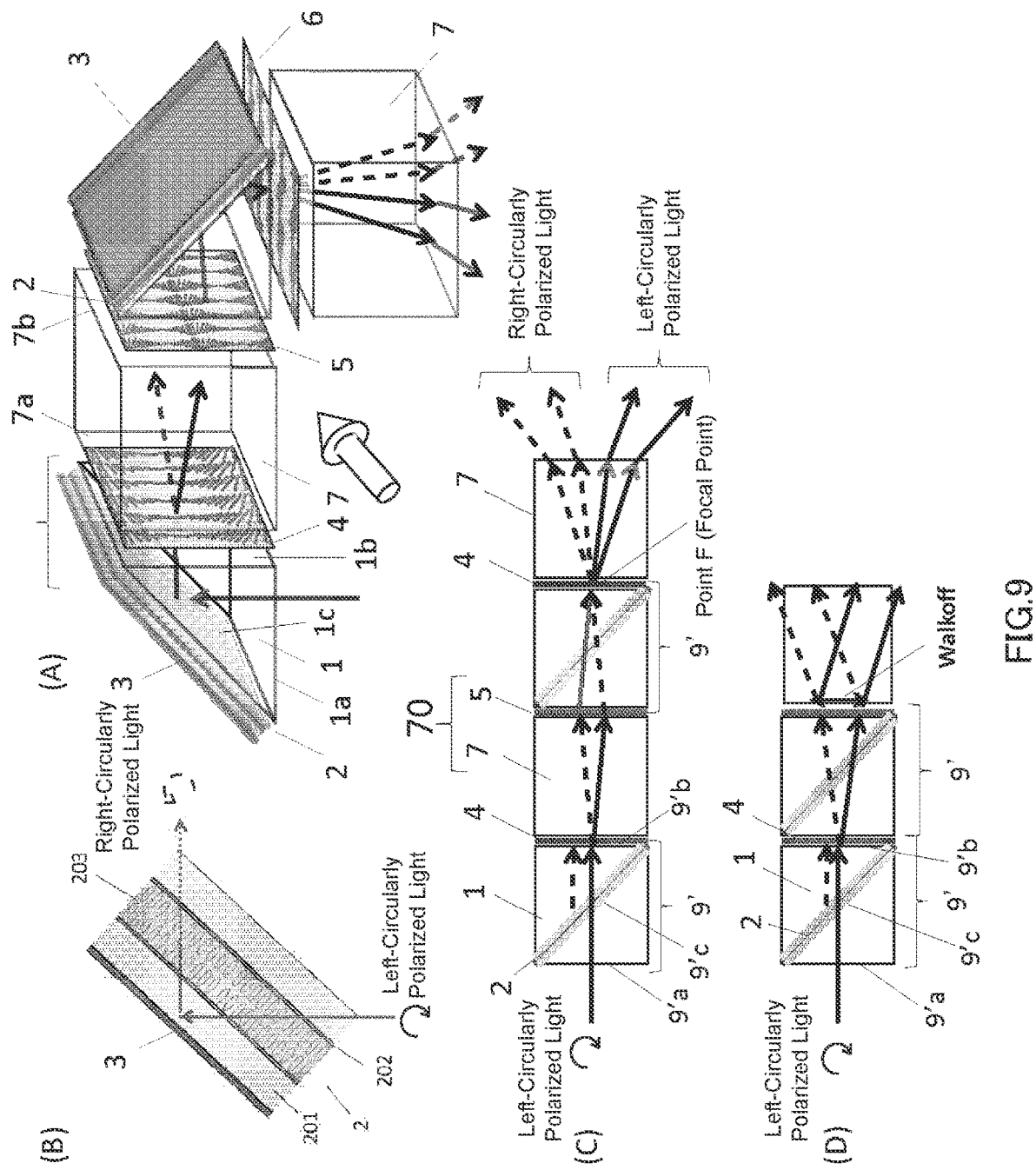
FIG. 9 is an illustration of an example of a 1×N optical beam switching element of the present invention, with (A) being a perspective view, (B) being a magnified view of a polarization switching element, (C) being a cross-sectional view as viewed in the direction of the arrow, and (D) being an illustration of a case in which this structure has not been implemented.

FIG. 9 depicts an example of a 1×N optical beam switching element according to the present invention. FIG. 9 depicts an example of a 1×4 optical beam switching element and an optical beam switching element assembly. (A) is a perspective view, (B) is a magnified view of a polarization switching element, (C) is a cross-sectional view as viewed in the direction of the arrow, and (D) is an illustration of a case in which this structure has not been implemented.

FIGS. 9(C) and 9(D) depict a reflective polarization switching element translated into a transmissive element. While this transmissive model is of course sufficiently functional as well, it has the disadvantage of degraded retardation efficiency, and, because the element is developed in one dimension, of extremely great length as the number N of the 1×N optical beam switching element increases.

Figure 1:
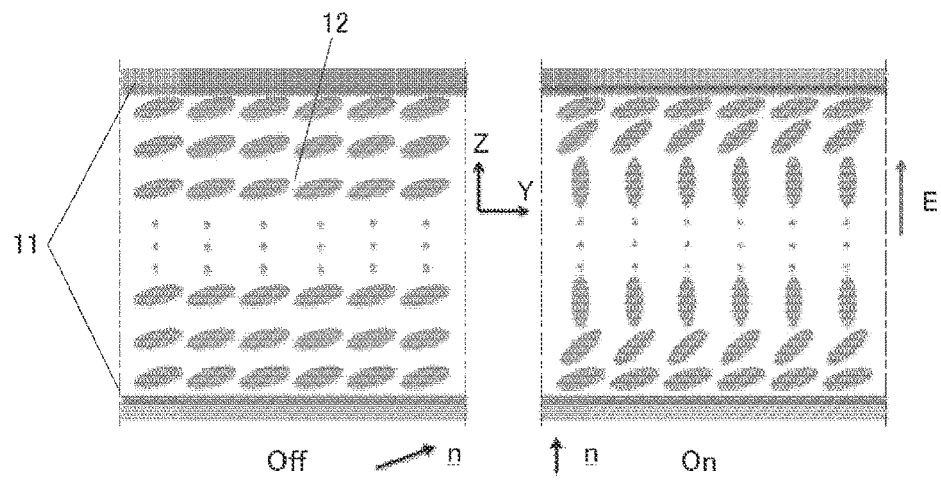
FIG. 1 is an example of a conventional nematic liquid crystal phase panel.
Figure 2:
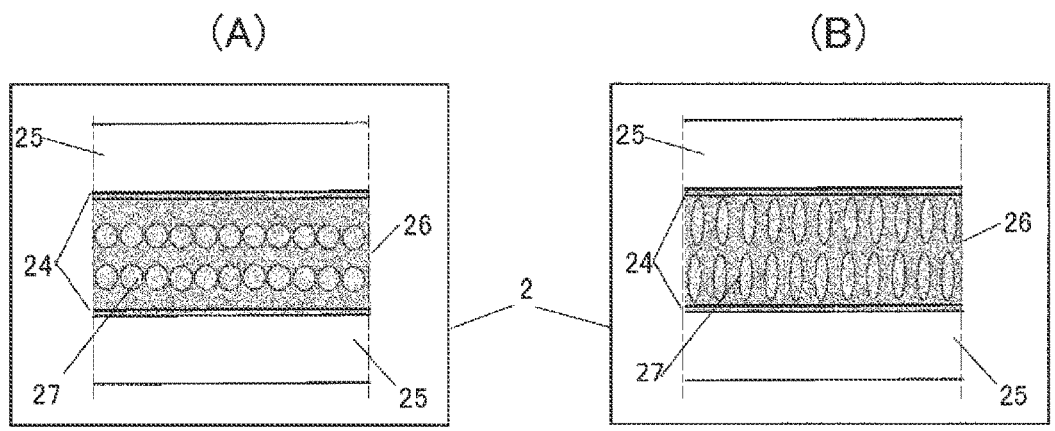
FIG. 2 is an illustration of polymer-stabilized blue-phase liquid crystal parallel electrodes according to the prior art.
Figure 3:
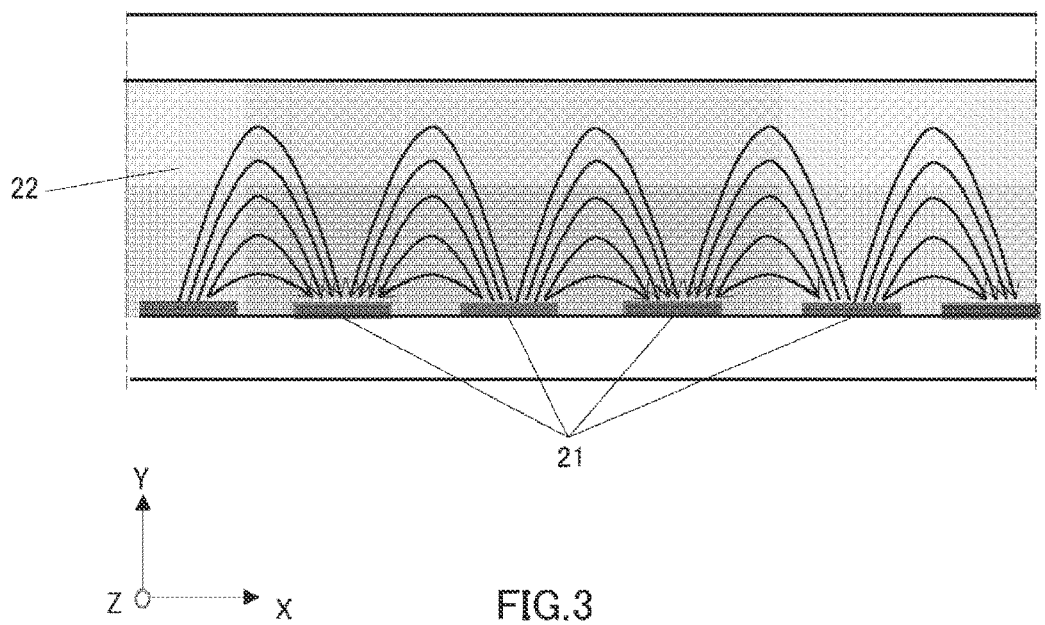
FIG. 3 is an illustration of a comb-teeth electrode for so-called IPS (in-plane switching) of polymer-stabilized blue phase liquid crystal.
Figure 4:
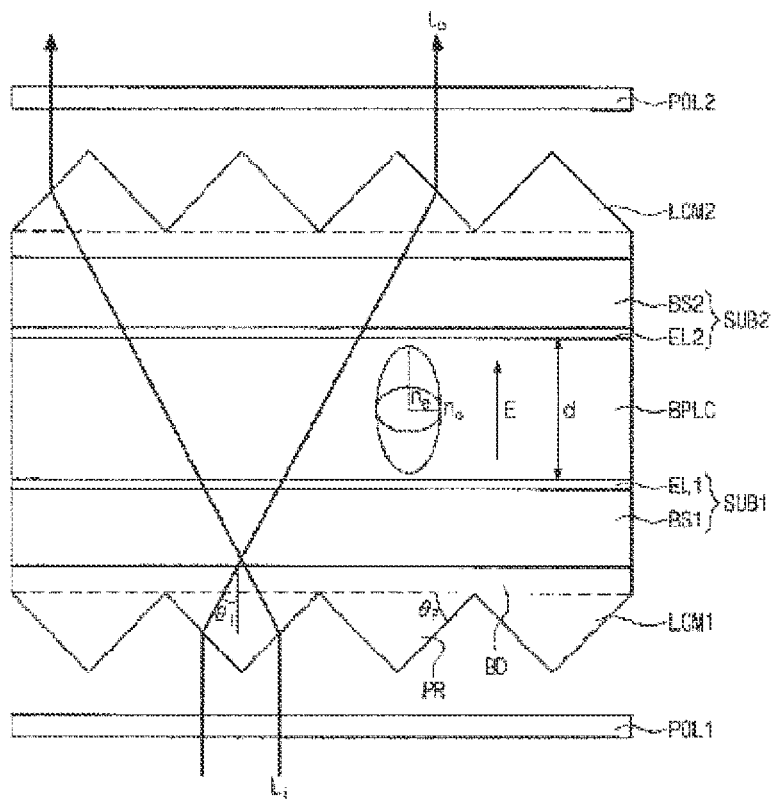
FIG. 4 is an illustration of the optical switching engine disclosed in Patent Document 1.
Figure 5:
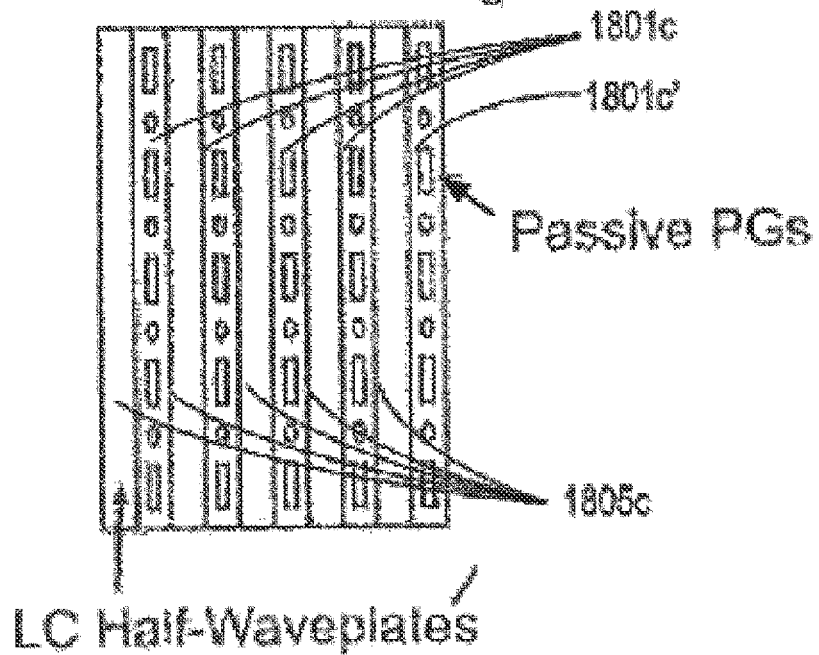
FIG. 5 is an illustration of the optical switching engine disclosed in Patent Document 2.
Figure 6:
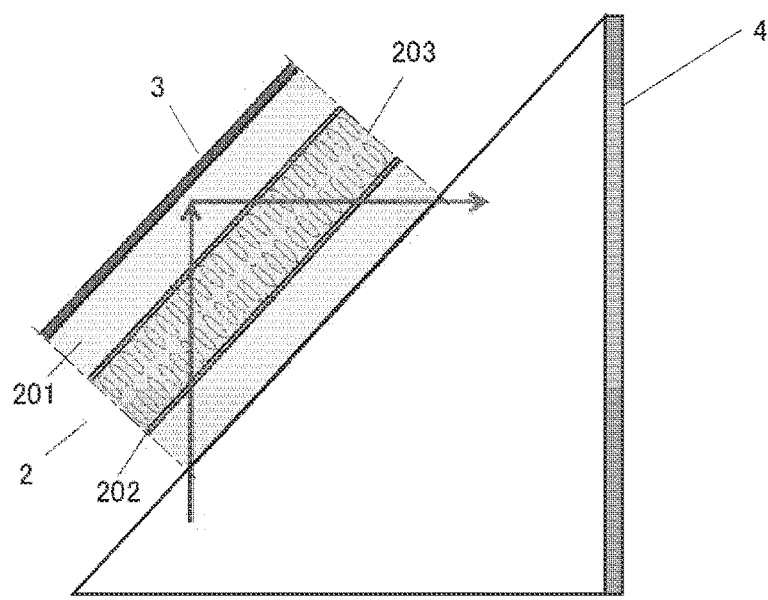
FIG. 6 is an illustration of a reflective optical beam switching element according to the present invention comprising polymer-stabilized blue phase liquid crystal and a polarization grating.

First, the polarization switching element 2 shown in FIG. 9(B) will be described. The polarization switching element 2 is constituted by blue phase liquid crystal 203 (polymer-stabilized blue phase liquid crystal) inserted between a glass substrate 201 and a pair of transparent electrodes 202 formed on one surface thereof. As discussed in connection with FIG. 2, when an electric field is applied to the blue phase liquid crystal 203, the index ellipsoids of the liquid crystal become ellipsoids having major axes in a direction orthogonal to the electrodes. As a result, when an optical beam enters the polarization switching element 2 orthogonally, the light passes through the index ellipsoids in a state in which the cross sections of the ellipsoids are circular, and no retardation is produced.

Therefore, light is made to enter at a 45° oblique input angle in this structure. The light is affected by the index of refraction of the ellipsoids formed by truncating the index ellipsoids in the 45° direction, thus producing retardation. In addition, the presence of a mirror 3 constituted by a multi-layer film dielectric mirror causes the light to pass back and forth through the blue phase liquid crystal 203, thus improving refractive efficiency.

When voltage is not applied to the polarization switching element 2, the index ellipsoids of the blue phase liquid crystal 203 are spheres; thus, retardation is not produced, and the element functions isotropically. In other words, the incident polarized light is transmitted unchanged. Meanwhile, when a suitable voltage is applied thereto, the polarization switching element 2 acts as a half-wave plate, and the rotation direction of, for example, left-circularly polarized light will be reversed to become right-circularly polarized light. Conversely, right-circularly polarized light becomes left-circularly polarized light. As a result, the element switches the rotation direction of circularly polarized light depending on the presence or absence of applied voltage.

Next, the efficacy of the present invention will be described with respect to FIG. 9(D). FIG. 9(D) depicts an example that presents problems when the present invention is not used. For ease of understanding, a reflective optical beam switching element 9 has been translated to a transmissive optical beam switching element 9' in FIG. 9(D).

As shown in FIG. 9(A), the reflective optical beam switching element 9 is formed by bonding the rear surface of the polarization switching element 2 to a sloped face 1c of a corner cube 1 (sloped member) made of a light-transmissive material, and bonding the polarization grating 4 to one square face (second planar face 1b) of the corner cube 1. The light-receiving face of the corner cube 1 constitutes a first planar face 1a. While the first planar face 1a and the second planar face 1b are orthogonal, as shown in FIG. 9(A), a range of about ±5° is tolerated for this angle.

In FIG. 9(A), a walk-off correction cube 70 (correction element), formed by mounting a focusing polarization grating 5 that focuses the outputted optical beam switching element to a cube 7 (element body) the sides of which are substantially identical to those of the corner cube 1, is mounted to the reflective optical beam switching element 9 comprising the corner cube 1, the polarization grating 4, and the mirror mounted to the front surface of the polarization switching element 2.

Specifically, in the walk-off correction cube 70, a mounting face 7a of the cube 7 is mounted to the face (substrate face) on which the polarization grating 4 is provided, and the focusing polarization grating 5 is mounted on a light-emitting face 7b of the cube 7. The light-emitting face 7b is parallel to the mounting face 7a.

In the first example, an optical beam switching element combining the reflective optical beam switching element 9 and the walk-off correction cube 70 forms a first set, and an $M^{th}$ set (wherein M is an integer equal to or greater than 2; in this example, 2) of optical beam switching elements is linked thereto. The integer M can be increased or decreased as desired, as in the case of the optical beam switching element assembly shown in FIG. 10 described below.

In FIG. 9(D), when the optical beam enters another square face (the first planar face 1a in FIG. 9(A)), the rotation of circularly polarized light is switched depending on whether or not voltage is being applied to the polarization switching element 2, enabling the outputted optical beam to be deflected (in this case, upward and downward).

In the transmissive optical beam switching element 9', the mirror 3 of the reflective optical beam switching element 9 is not used, the polarization switching element 2 is sandwiched between sloped faces 9'c of two corner cubes 1, the polarization grating 4 is disposed on or bonded to a face on one side (light-emitting face 9'b) opposing a light-receiving face 9'a, and light enters the light-receiving face 9'a. The transmissive optical beam switching element 9' has lower polarization efficiency than the reflective optical beam switching element 9 since light only passes through the polarization switching element 2 once.

Figure 11:
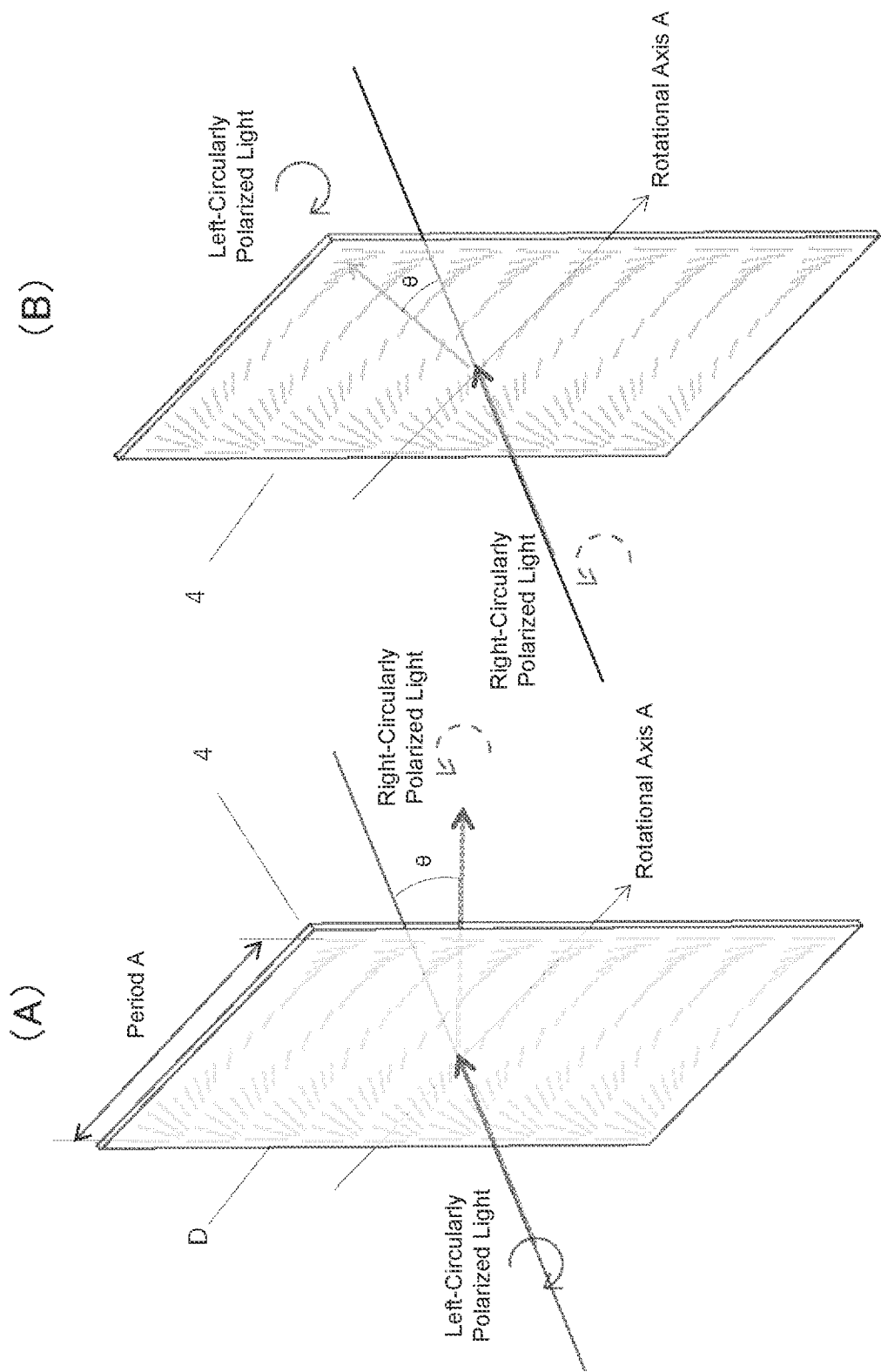
FIGS. 11(A) and (B) are illustrations of a polarization grating 4 in which a birefringent director rotates in one direction at a given period.

As shown in FIG. 11, the polarization grating 4 has a birefringent director D that rotates in one direction at a given period, and has a function of deflecting the outputted optical beam to the left or right when an optical beam of circularly polarized light enters the grating, depending on the rotation direction of the circularly polarized light. The principles and function thereof will be described in detail below.

Returning now to FIG. 9(D), when left-circularly polarized light enters the transmissive optical beam switching element 9', the rotation direction of the circularly polarized light is reversed and right-circularly polarized light (dotted lines) is outputted, or the circularly polarized light is outputted unchanged (solids lines) as left-circularly polarized light, depending on the presence or absence of voltage. Subsequently, after passing through the polarization grating 4, the optical beam is deflected upward or downward depending on the rotation direction of the circularly polarized light. When the beam then enters the next transmissive optical beam switching element 9', the optical beam is not deflected from a single point, and walk-off is produced.

Figure 7:
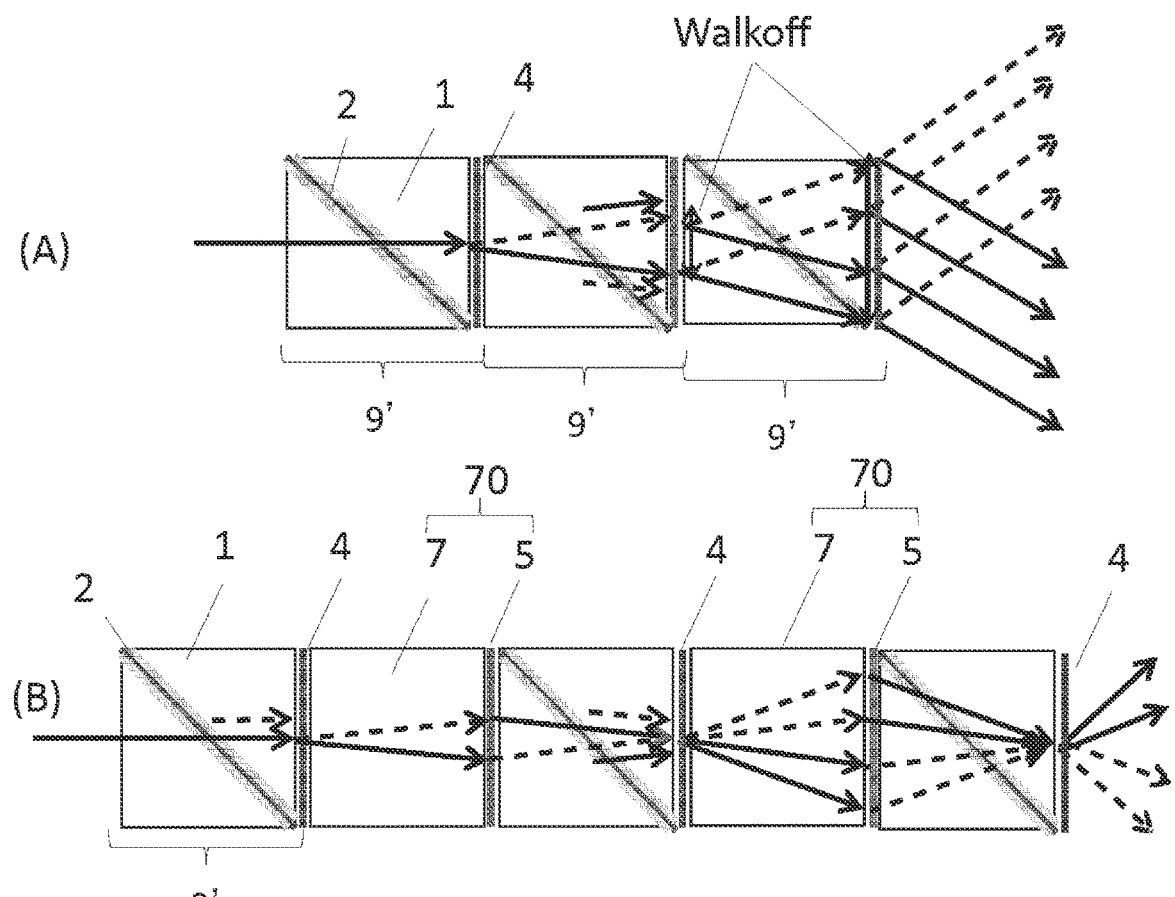
FIG. 7(A) is an illustration of a conventional example in which the outputted optical beam deviates from the center (referred to as "walk-off")
FIG. 7(B) is an illustration of the basic arrangement of the present invention, in which this problem is ameliorated.

As shown, for example, in FIG. 7(A), walk-off accumulates as the number of connected stages increases, causing the outputted optical beam to diverge from the opening of the cube and become a fatal problem in multi-point switches. This presents particular difficulty in achieving large-angle deflection switching elements.

Thus, as shown in FIG. 9(C), a columnar walk-off correction cube 70 (correction element) is disposed following a reflective (or transmissive) optical beam switching element (in this case, a transmissive element). The walk-off correction cube 70 is formed by disposing or bonding a focusing polarization grating 5 that focuses the outputted optical beam on or to a cube 7 the sides of which are substantially identical to those of the corner cube 1.

What is important here is that the rotation direction of the circularly polarized light of the optical beam is separated into right- and left-handed upper and lower halves, as shown in FIG. 9(C). These circumstances arise when a reflective (or transmissive) optical beam switching element 9' utilizing a polarization grating 4 having a small polarization angle is connected to a following reflective (or transmissive) optical beam switching element 9' having a polarization grating 4 having a polarization angle that is approximately double the first angle, and this process is repeated to form a 1×N optical beam switching element, and an optical beam enters the small-angle polarization grating 4.

Consequently, it is extremely important to limit the combination of polarization gratings 4 and the input direction. In this way, the circularly polarized light separated into right-handed and left-handed upper and lower halves by the focusing polarization grating 5 bonded to the cube 7 can be refocused to a single point. In other words, the element is formed so that the angle of the optical beam with which the focusing polarization grating 5 is irradiated and the angle of the exiting optical beam are symmetric when the travel direction of the optical beam is viewed from the side. In this arrangement, as shown in FIG. 9(C), the subsequent polarization grating 4 deflects the optical beam from a single point centered on point F (focal point), making it possible to eliminate the walk-off that posed a problem previously.

Moreover, even if this process is repeated to connect multiple reflective (or transmissive) optical beam switching elements (transmissive elements shown in drawing), as shown in FIG. 7(B), walk-off can be periodically reduced to zero, enabling a 1×N optical beam switching element having zero walk-off overall to be achieved.

In Example 1, a non-reflective coating is preferably formed on the first planar face 1a, second planar face 1b, and sloped face 1c of the corner cube 1 and the light-receiving face and light-emitting face of the cube 7. The same holds for the light-receiving face 9'a, light-emitting face 9'b, and sloped face 9'c of the transmissive optical beam switching element 9'. A metal mirror rather than a multi-layer film dielectric mirror may also be used for mirror 3 in Example 1.

Example 2

Figure 10:
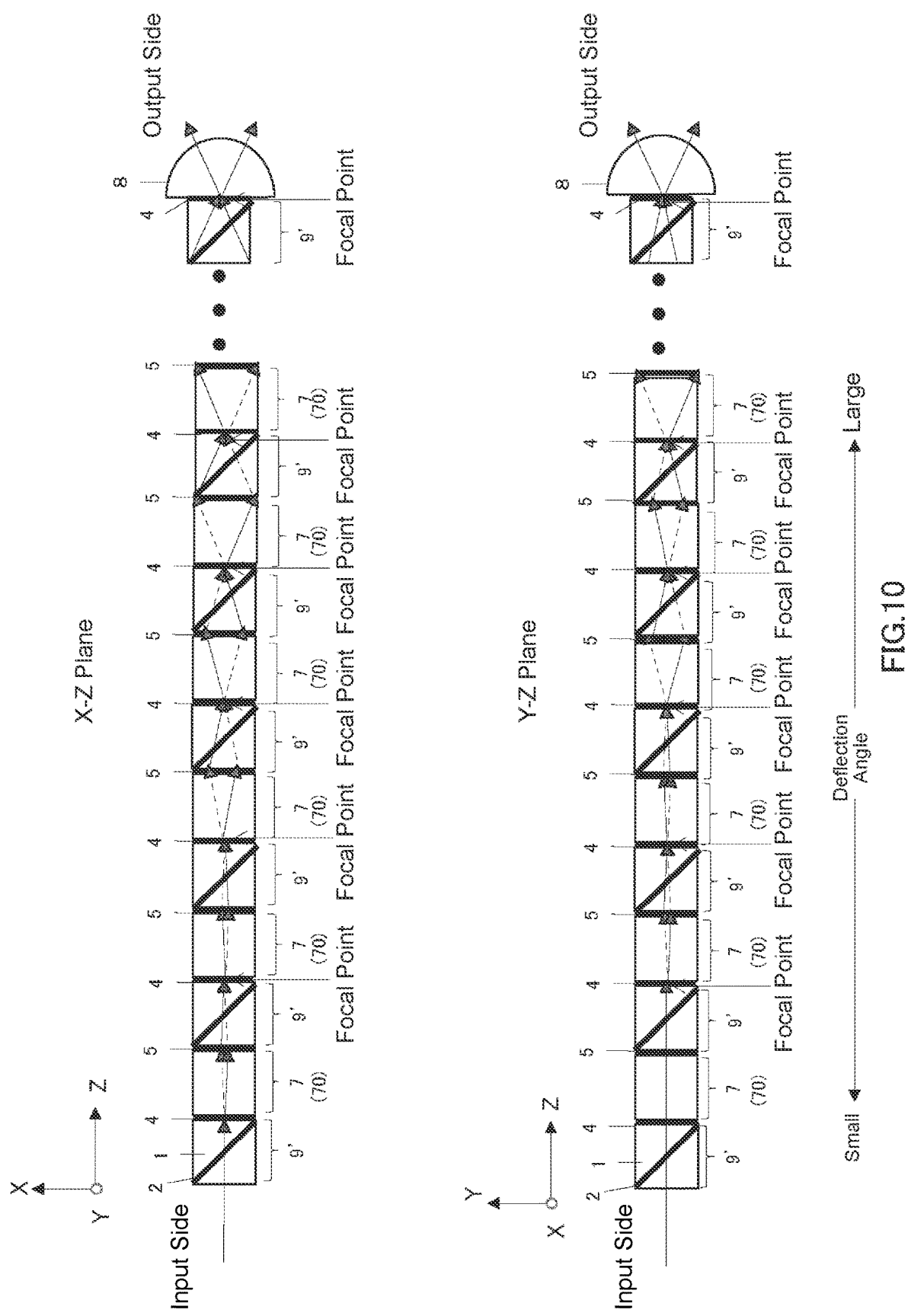
FIG. 10 is an illustration of an example of a two-dimensional optical beam face switching element obtained by applying the present invention to orthogonal X- and Y-axes.

This structure can also be applied to orthogonal X- and Y-axes to make possible a planarly arrayed two-dimensional plane switching arrangement. An example thereof is shown in FIG. 10. For ease of understanding, only the marginal beams (the upper and lower end beams) of the optical beam are shown. FIG. 10(A) shows the path of an optical beam in the X-Z plane, and FIG. 10(B) shows the path of an optical beam in the Y-Z plane. The polarization grating 4 deflects only in one direction (e.g., the X-direction or the Y-direction); thus, the non-deflecting direction is indicated by dotted lines.

What is important here is that the polarization grating 4 on the input side have a small deflection angle in both the X-direction and the Y-direction, gradually becoming a deflection angle that is approximately twice as large toward the output side, as shown in FIG. 10. To this end, the period ∇ of the of the polarization grating 4 should gradually become half as long toward the output side.

In FIG. 10, a transmissive optical beam switching element 9' is first used to deflect the optical beam in the X-direction, followed by using a walk-off correction cube 70 to focus the beam on a single pint, followed by deflecting the optical beam in the Y-direction this time, followed by again using a walk-off correction cube 70 to focus the beam on a single point, which process is repeated to achieve a 1×N optical beam switching element that operates in a two-dimensional plane.

Figure 8:
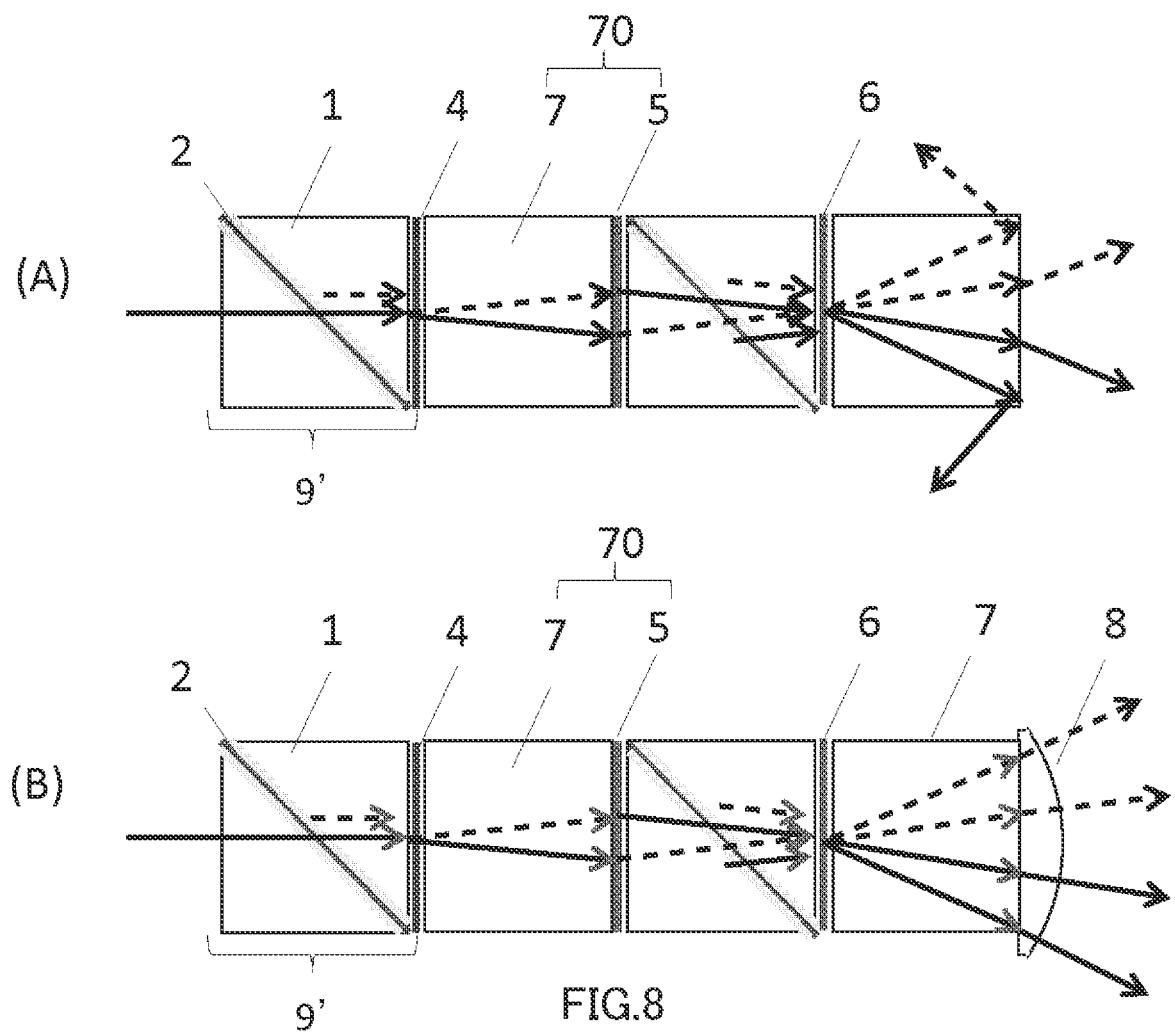
FIGS. 8(A) and (B) are illustrations of structures in which a lens is disposed on or bonded to the output end surface of the present invention.

A hemispherical lens 8 centered on the final focal point is disposed on the final output end in order to eliminate the effects of total internal reflection shown in FIG. 8(A). This enables the suppression of total internal reflection of wide-angle optical beams as shown in FIG. 8. Apart from a hemispherical lens 8, a compound lens system can also be used to alter the spot diameter or deflection angle of the optical beam.

Figure 12:
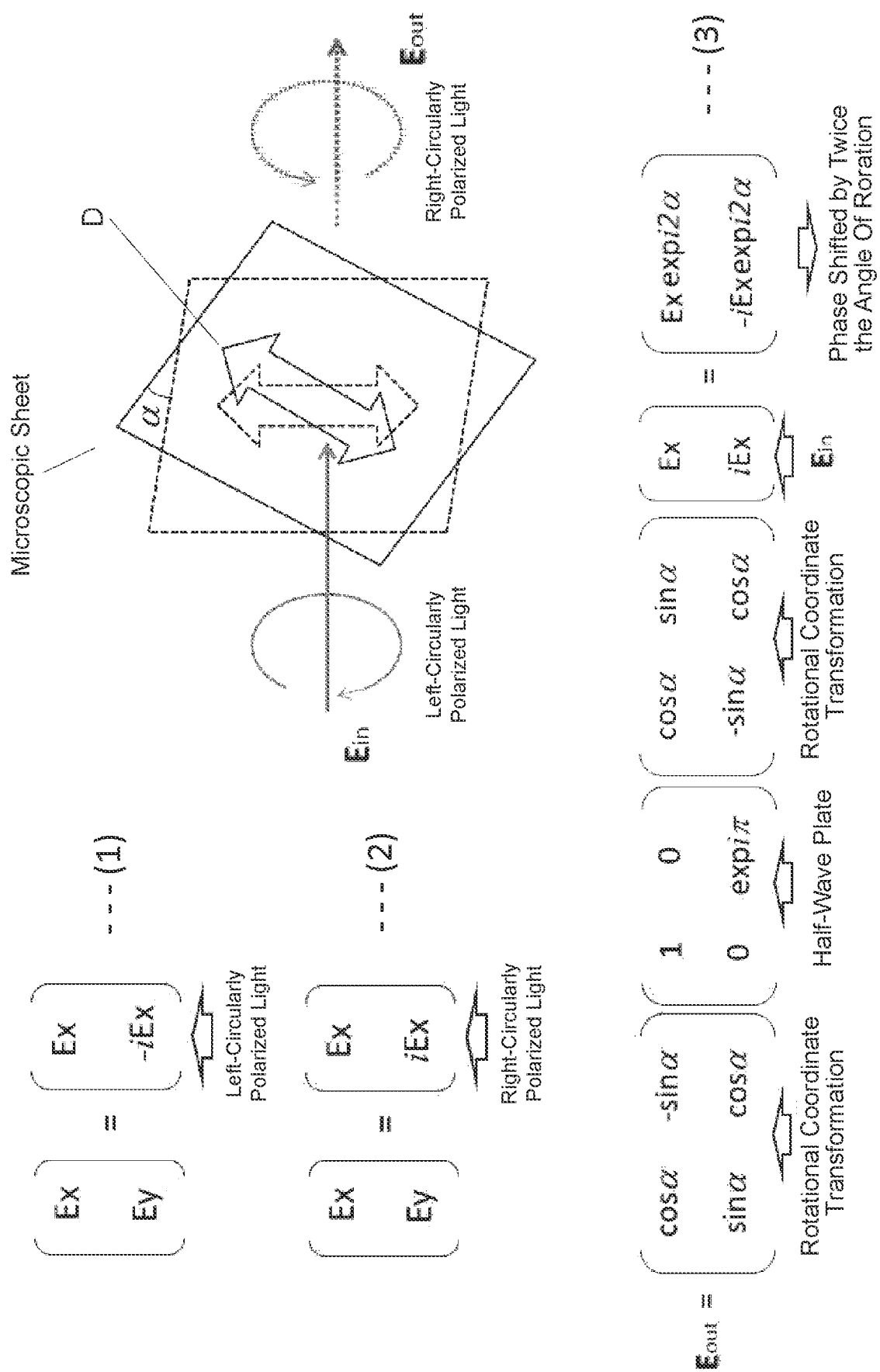
FIG. 12 shows the director structure and function of a focusing polarization grating 5.

It is the focusing polarization grating 5 used in the walk-off correction cube 70 that has a vital function here. The structure and function of the focusing polarization grating 5 will be set forth below with respect to FIG. 12. The polarization grating 4 or the focusing polarization grating 5, which is a modification of the former, has a birefringent focusing director (e.g., a liquid crystal polymer molecule) that rotates at period ∇.

The function of this structure will be explained using Jones vectors. In Jones vectors, left-handed and right-circularly polarized light are respectively expressed as formula (1) and formula (2).

[Numerical formula 1]

Left-Circularly Polarized Light

[Numerical formula 2]

Right-circularly polarized Light

Consider a microscopic sheet comprising a director D, wherein the microscopic sheet has a thickness such that the sheet acts as a half-wave plate, and is rotated by an amount α from a reference. An α-rotated element can be expressed in terms of Jones vectors as the product of a Jones matrix for a half-wave plate sandwiched on the right and left by coordinate rotation Jones matrices.

When right-circularly polarized light enters the element, the rotation direction of the outputted polarized light is reversed to yield left-circularly polarized light, and the phase is rotated by 2α, as shown in formula (3). In other words, the phase is advanced (or delayed) by twice the rotational angle of the director D.

[Numerical formula 3]

$$E_{out} = \underbrace{\begin{pmatrix} \cos\alpha & -\sin\alpha \\ \sin\alpha & \cos\alpha \end{pmatrix}}_{\text{Rotational Coordinate Transformation}} \underbrace{\begin{pmatrix} 1 & 0 \\ 0 & \exp i\pi \end{pmatrix}}_{\text{Half-Wave Plate}} \underbrace{\begin{pmatrix} \cos\alpha & \sin\alpha \\ -\sin\alpha & \cos\alpha \end{pmatrix}}_{\text{Rotational Coordinate Transformation}} \underbrace{\begin{pmatrix} Ex \\ iEx \end{pmatrix}}_{E_{in}} = \quad (3)$$

$$\underbrace{\begin{pmatrix} Ex \exp i2\alpha \\ -iEx \exp i2\alpha \end{pmatrix}}_{\text{Phase Shifted by Twice the Angle of Rotation}}$$

FIG. 13 depicts the phase distribution and the output angle of the optical beam in the X-axial direction (the direction in which the director D rotates) when left-circularly polarized light enters the polarization grating 4. (A) shows an instance in which the rotational angle α of the director D increases in the forward direction along the X-axis, and (B) an instance in which the rotational angle α of the director D decreases in the forward direction along the X-axis. While the rotation direction of the outputted circularly polarized light is right-handed in both cases, the direction of the optical beam is respectively deflected in the left and right directions, depending on the slope of the equiphase surface (wavefront), upon passage through the polarization grating 4. The deflection angle θ thereof is calculated according to the following formula.

[Numerical formula 4]

$$Ns \cdot \sin\theta_{out} = Ns \cdot \sin\theta_{in} + m \cdot \lambda / \nabla \quad (4)$$

In the formula, Ns is the index of refraction of the medium, θin is input angle, θout is output angle, λ is wavelength, ∇ is the period of the polarization grating, and m is an order indicating the rotation direction of the circularly polarized light (+, −1).

Figure 14:
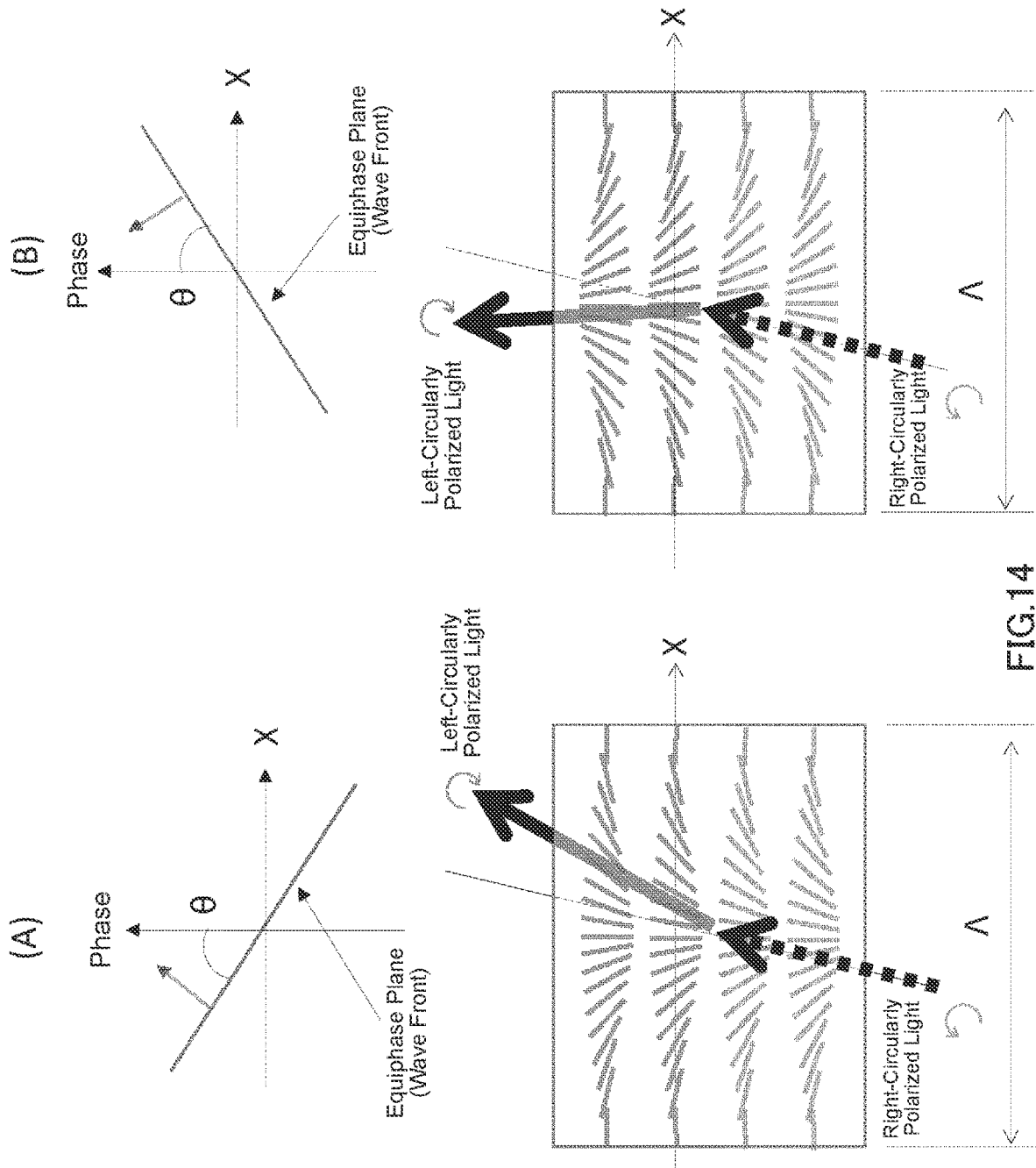
FIG. 14 is an illustration of the phase distribution and the output angle of the optical beam in the X-axial direction (the direction in which the director rotates; right-handed in FIG. 14(A), left-handed in FIG. 14(B)) when right-circularly polarized light enters the polarization grating 4.

FIG. 14 depicts the phase distribution and the output angle of the optical beam in the X-axial direction (the direction in which the director D rotates) when right-circularly polarized light enters the polarization grating 4. It is apparent that the deflection direction is reversed from FIG. 13.

Figure 15:
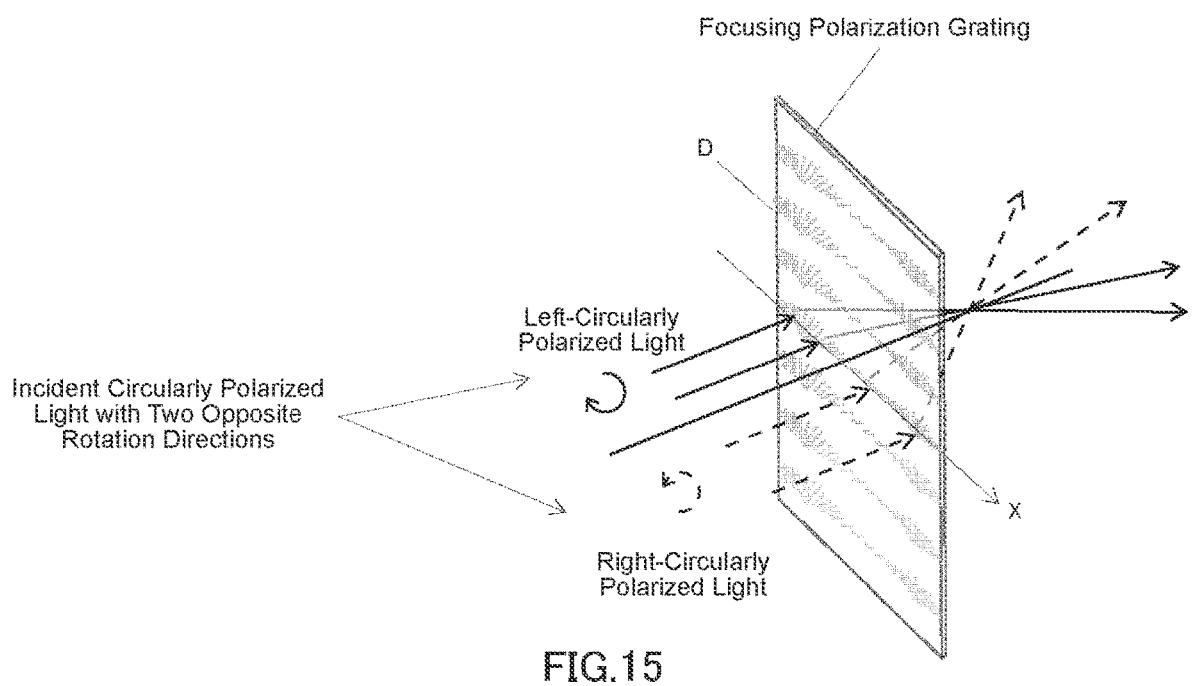
FIG. 15 is an illustration of a focusing polarization grating 5.

As discussed above, the focusing polarization grating 5 used in the 1×N optical beam switching element of the present invention must focus incoming circularly polarized light having opposite rotation direction in the left and right halves to a single point, as shown in FIG. 15.

Figure 16:
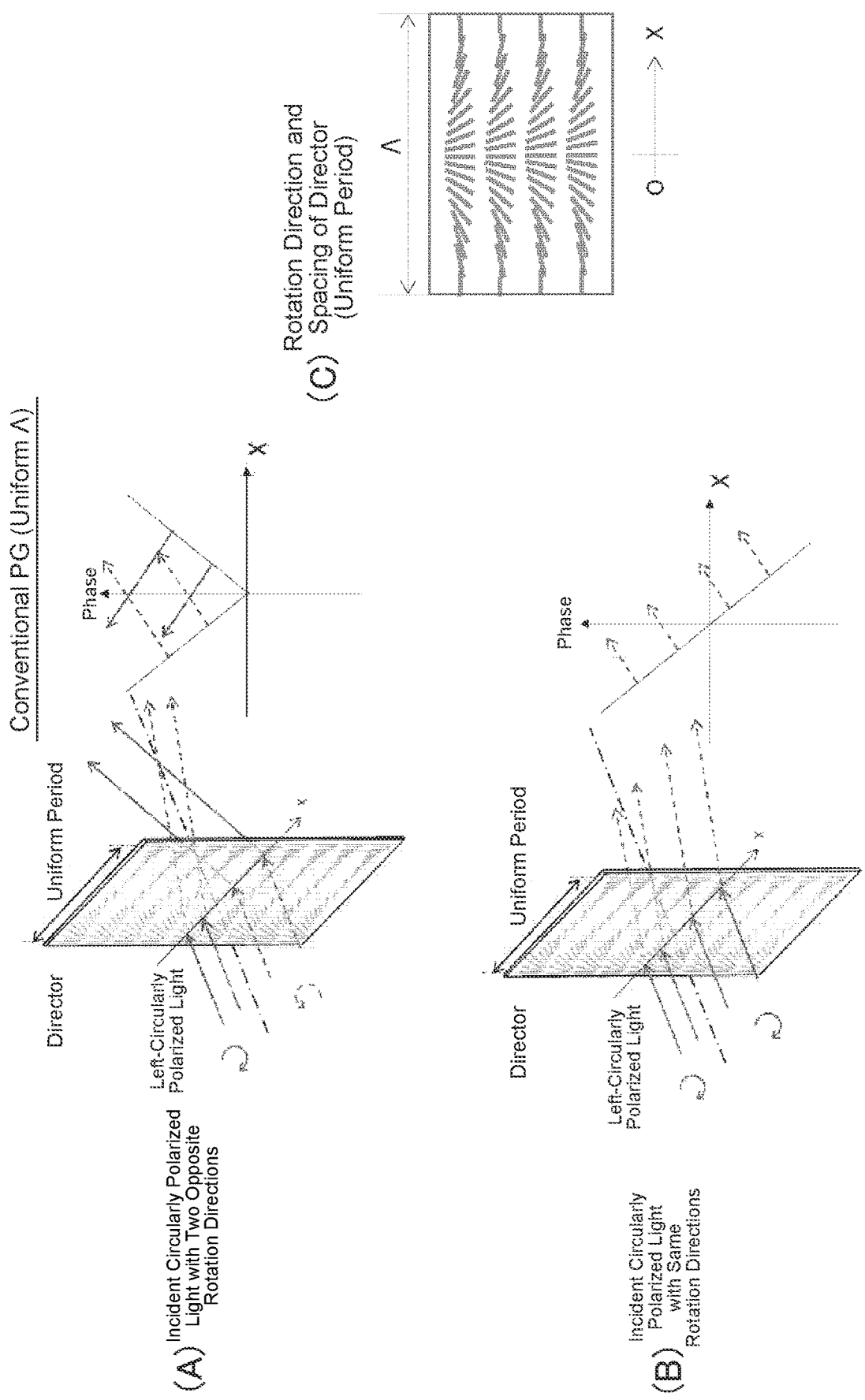
FIG. 16 is an illustration of a conventional polarization grating (PG), with FIG. 16(C) depicting a polarization grating having a uniform λ, and FIGS. 16(A) and (B) being illustrations of the path of optical beams of circularly polarized light in the reverse direction and circularly polarized light in the same direction of rotation, respectively, passing through FIG. 16(C).

FIG. 16 shows the path of an optical beam after passing through a conventional polarization grating (PG) having a uniform period of k, as shown in (C), when the incoming circularly polarized light has opposite rotation direction in the left and right halves (A) and when the incoming circularly polarized light has the same rotation direction in both halves (B). In (A), the optical beam is directed toward the center, but does not converge on a single point. In (B), all optical beams are deflected in the same direction.

Figure 17:
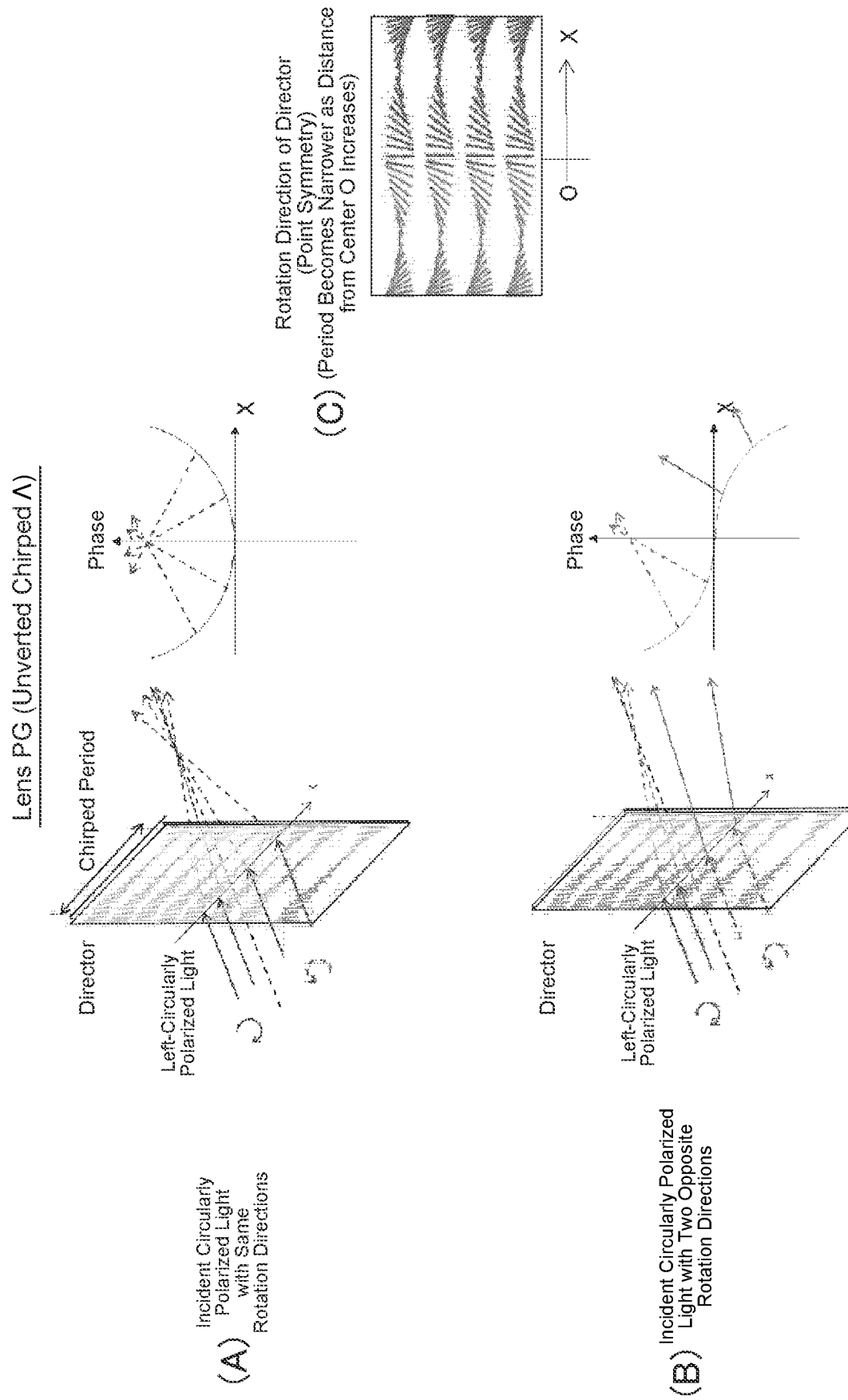
FIG. 17(A)-(C) are illustrations of a light-focusing polarization grating (lens PG [inverted chirped λ]) disclosed in Non-Patent Document 2.

Meanwhile, a light-focusing polarization grating (lens PG) such as shown in FIG. 17 has been reported (Non-Patent Document 2). In this grating, the director D rotates in a direction such that the director exhibits point symmetry (inversion) around a center O, and the period thereof is narrower (shorter) so as to yield a progressively circular or parabolic phase distribution away from the center O, as shown in (C). While the passed light will converge on a single point when the incoming optical beam is light circularly polarized in the same direction, as shown in (A), the light will not converge on a single spot, as shown in (B), when the incoming circularly polarized light has opposite rotation direction in the left and right halves, which are the incidence conditions of the 1×N optical beam switching element of the present invention.

Example 3

Figure 18:
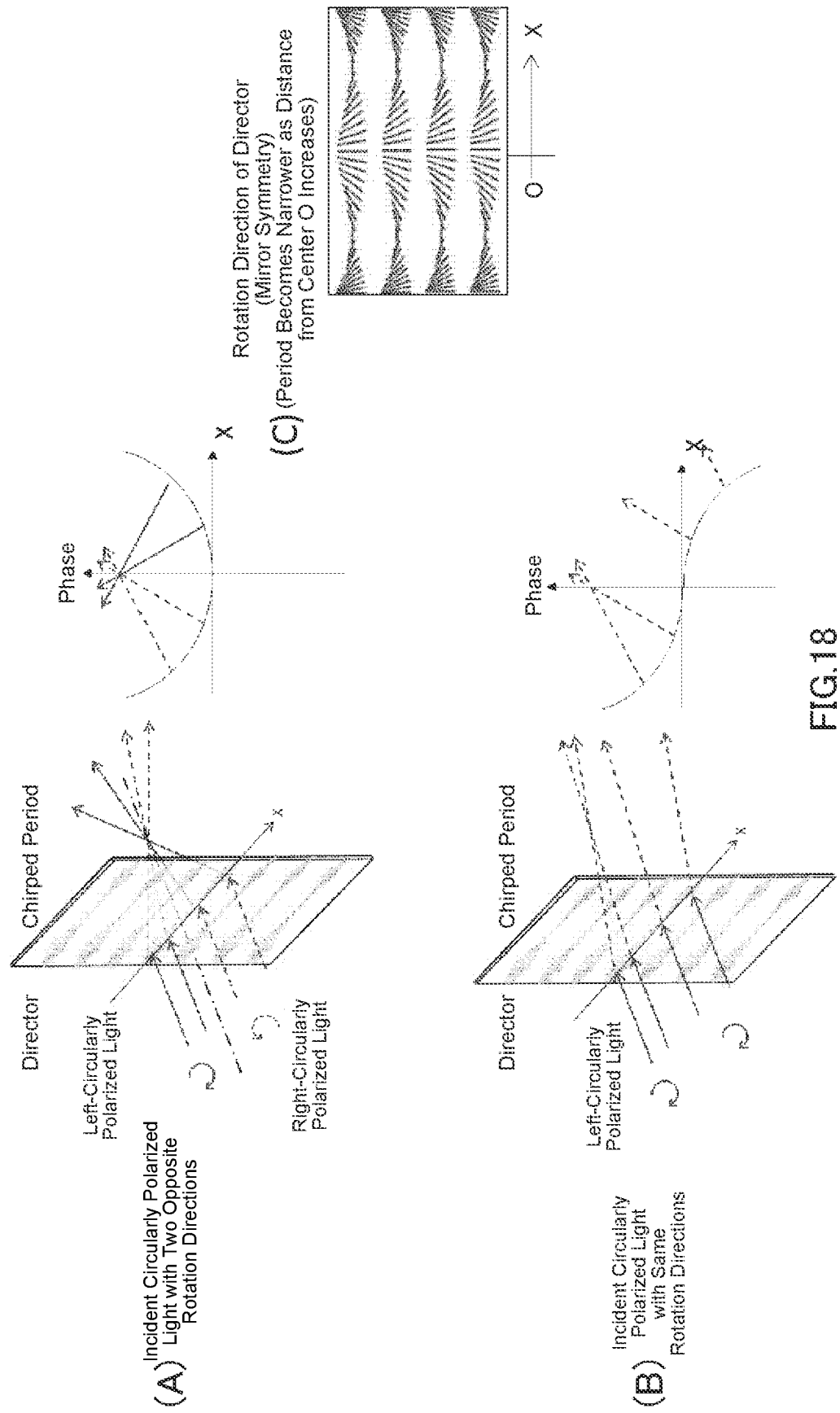
FIG. 18(A)-(C) are illustrations of a chirped PG (chirp λ) in which the director has mirror symmetry with respect to the center O, and the period thereof is narrowed so that the phase thereof takes on a circular or parabolic phase distribution as the phase moves away from the center O.

Thus, the chirped PG shown in FIG. 18 is used. In this PG, the director D has mirror symmetry with respect to the center O (reference position), and the period thereof gradually becomes narrower (shorter) from center) outward so that the phase thereof takes on a circular or parabolic phase distribution. When circularly polarized light having opposite rotation direction in the left and right halves enters the chirped PG, the light converges toward a single point in the center, as shown in FIG. 18(A). For reference, incoming circularly polarized light having the same rotation directions does not converge on a single point, as shown in FIG. 18(B).

Consequently, in the case of a one-dimensional 1×N optical beam switching element, the focusing polarization grating 5 can be achieved by using a chirped PG.

However, this becomes somewhat more complicated in the case of a two-dimensional element. A method of achieving the two-dimensional focusing polarization grating 5 (focusing 2D_PG) for use in a two-dimensional 1×N optical beam switching element will be described below. This method comprises two steps.

Example 4

The method will be described with reference to FIG. 19. FIG. 19(A) is a schematic illustration of the two-dimensional 1×N optical beam switching element shown in FIG. 10 represented as a transmissive element. (B) shows a technique for a focusing 2D_PG needed to focus, at point H, the XY spatial distribution of light at point G in (A).

Figure 20:
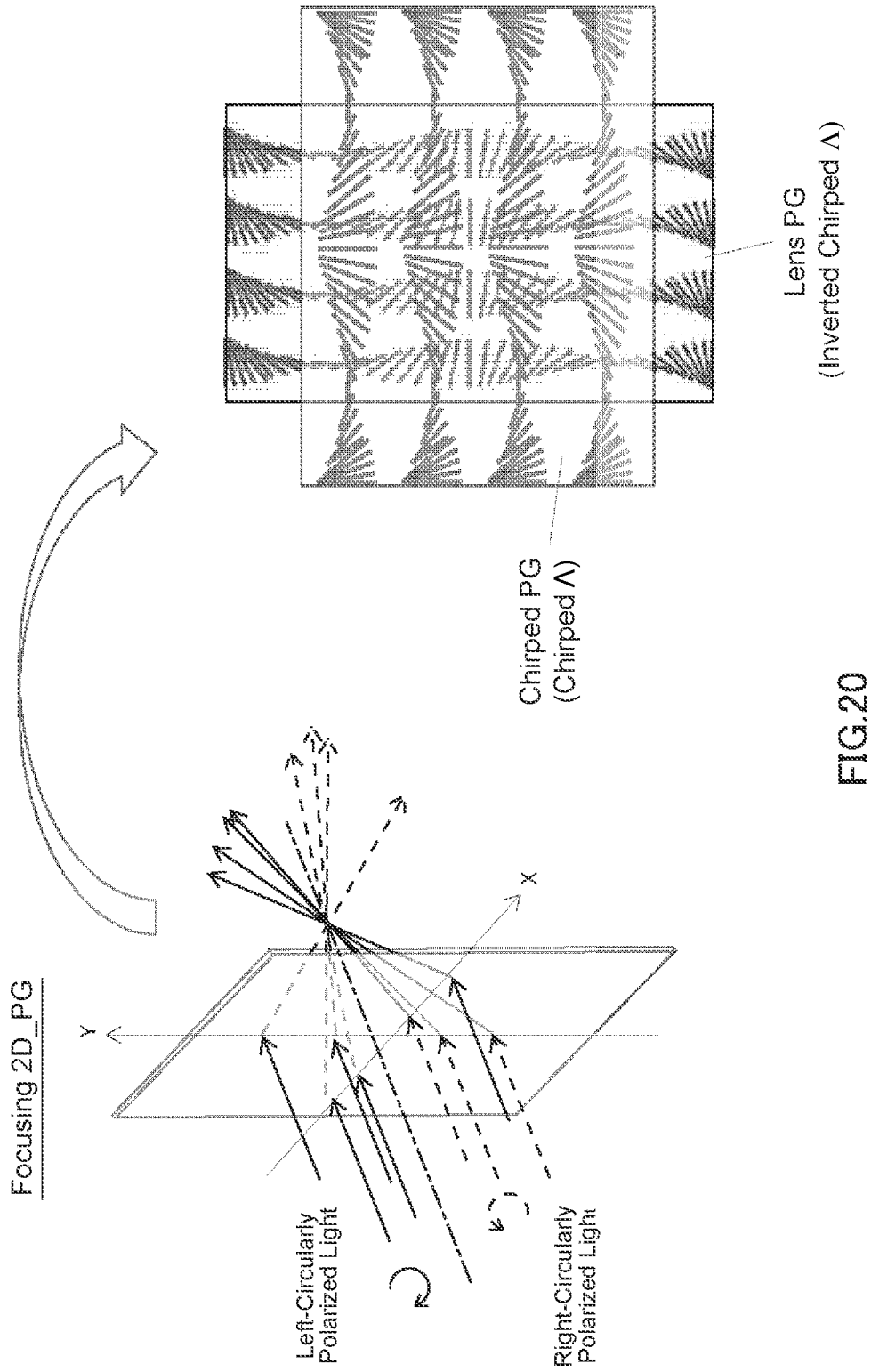
FIG. 20 is a schematic illustration of a two-dimensional polarization grating (focusing 2D_PG5) obtained by bonding a set of a lens PG and a chirped PG of the present invention.

As shown in FIG. 19(B) light is first focused in the Y-direction during the lens PG described above. This is in order to focus circularly polarized light having the same rotation directions. Subsequently, in order to focus two types of circularly polarized light of different rotation direction this time, light is focused in the X-direction using the chirped PG, and finally converged on a single point. The reverse order is also possible. In other words, the focusing 2D_PG can be achieved by bonding one set of a lens PG and a chirped PG, as shown in FIG. 20.

Example 5

Figure 21:
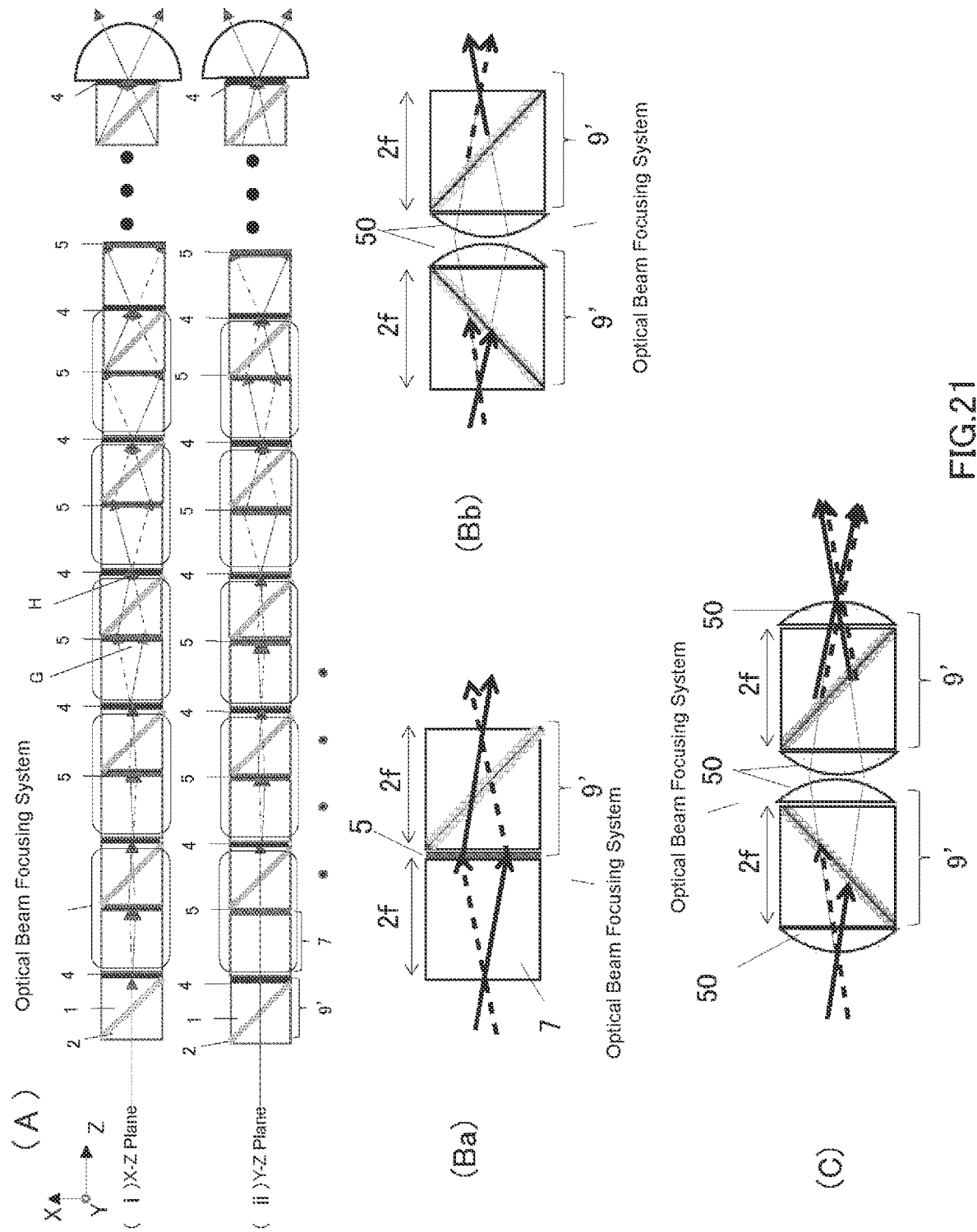
FIGS. 21(A) and (Ba) are reposted. (Bb) depicts a case in which an optical beam focusing system is achieved using an ordinary convex lens. (C) depicts a case in which an ideal optical beam focusing system for image conversion is achieved using an ordinary convex lens.

FIG. 21 shows another example. The schematic illustration (A) of the two-dimensional 1×N optical beam switching element shown in FIG. 10 represented as a transmissive element is used again here. This basic structure is constituted by a series of optical beam focusing systems (the portions surrounded by dotted lines) each sandwiched between two polarization gratings 4 having different periods k, around which are disposed in input transmissive optical beam switching element and an output lens.

In FIG. 21, (Ba) depicts a case in which an optical beam focusing system is achieved using the focusing 1D_PG or focusing 2D_PG 5 described above, and (Bb) depicts a case in which an optical beam focusing system is achieved using an ordinary convex lens. (C) depicts a case in which an ideal optical beam focusing system for image conversion is achieved using an ordinary convex lens. Similar light-focusing effects can also be obtained using the arrangements shown in (Bb) and (C).

As discussed above, when a focusing 1D_PG or focusing 2D_PG is used, the direction of the PG must be defined according to the rotation direction of the incoming circularly polarized light, and a polarization switching element cannot be placed in front of the focusing 1D_PG or focusing 2D_PG 5; thus, a cube 7 is used (Ba).

Meanwhile, the rotation direction of the circularly polarized light need not be taken into account if an ordinary lens is used. Thus, a transmissive optical beam switching element 9' can be used instead of the cube 7 (Bb). As a result, polarization is controlled using two polarization switching elements, thus advantageously allowing voltage to be reduced. As discussed below, a reflective may also be used instead of the transmissive optical beam switching element 9'.

The operation thereof will be described in detail with reference to FIG. 22.

First, equivalent lens systems for an instance in which an optical beam focusing system is achieved using a focusing 1D_PG or a focusing 2D_PG (Ba) and an instance in which an optical beam focusing system is achieved using an ordinary convex lens 50 (Bb) are shown in (B-1) (lens-type correction element). This is equivalent to a system wherein, defining 2f as the length of the cube 7, a lens having a focal length f is situated in the center, and transmissive lenses are disposed on the input and output faces 2f away to the left and right. (B-2) is the transfer matrix of this equivalent lens system.

The response when an optical beam enters the transmissive lens system at position X and angle α is shown in (B-3). The optical beam incident at position X has the shape of −X, i.e., a reversed image, and an angle of −X/f added to the reverse angle −α. In the cases of beams having a small X, −X/f≈0 and thus negligible, thus yielding an ideal focusing system in which both position X and angle α reverse, whereas the system diverges from an ideal focusing system as X increases.

Meanwhile, FIG. 22(C) is a structure that avoids this problem. Here as well, the cube length is 2f. This structure uses an ordinary convex lens 50 instead of the focusing 2D_PG described above, and functions regarding of the aforementioned rotation direction of the circularly polarized light.

Figure 22:
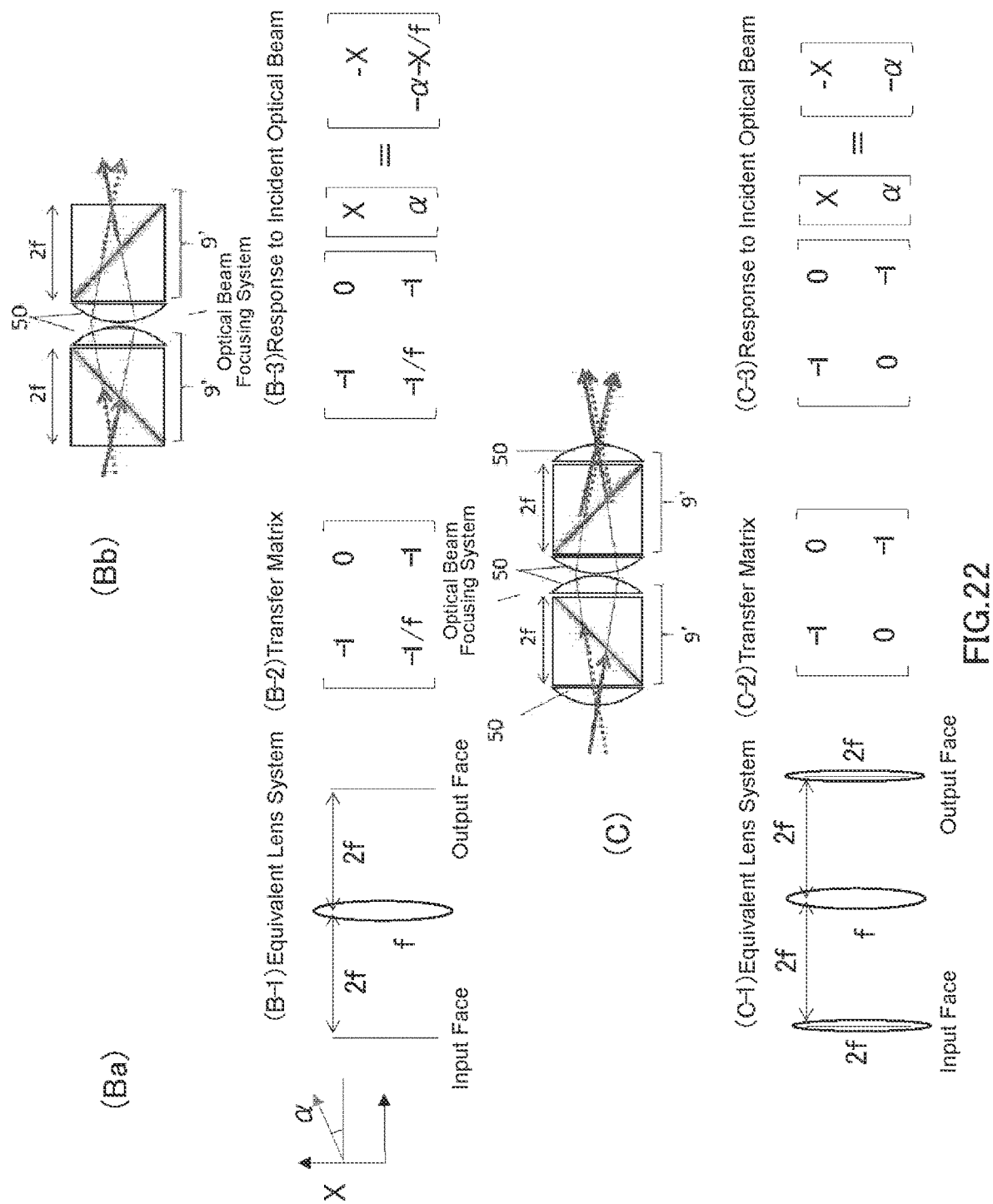
FIGS. 22(B-1) and (C-1) are illustrations of a lens system equivalent to that shown in FIG. 21(Bb) and (C), (B-2) and (C-2) are illustrations of a transfer matrix of the same, and (B-3) and (C-3) are illustrations of the response thereof to an incident optical beam.

In FIG. 22, (C-1) represents an equivalent lens system, and comprises additional lenses having focal lengths of 2f on the input and output faces compared to (B-2). As shown in (C-2), this transfer matrix is a diagonal matrix containing −1 elements, and yields an ideal focusing system that always responds to an incoming optical beam of position X and angle α with reversed position X and angle α, even when X is large.

However, because the 1×N optical beam switching element of the present invention is used in conditions wherein X≈0, any of formats (Ba), (Bb), and (C) can be used.

FIG. 23 shows an actual structure for achieving FIGS. 22(Bb) and (C). (A-1) and (A-2) are examples of the structure in FIG. 22(Bb) wherein the convex surfaces of two convex lenses 50 are disposed abutting each other between two reflective polarization switching elements 9 (lens-type correction elements). The focal length of each of the two convex lenses 50 is 2f, and becomes f when the two are combined. (A-1) is a reflective structure, and (A-2) is a reflective structure.

FIGS. 23(B-1) and (B-2) are instances of FIG. 22(C) constituted by the structures shown in (A-1) and (A-2) with additional convex lenses 50 disposed on the input and output faces of the corner cubes 1. An integrated whole comprising these corner cubes 1 and convex lenses 50 can easily be manufacturing using a glass mold. The convex lenses 50 may be semicylindrical lenses as shown in FIG. 23, or typical spherical lenses.

Example 6

A structure for creating a compact three-dimensional arrangement of the one-dimensionally arranged 1×N optical beam switching element shown in FIG. 10 will be described below. In this example, the optical beam switching elements are positioned not only in plane XY, but also raised in the Z-direction to form a three-dimensional assembly.

Figure 24:
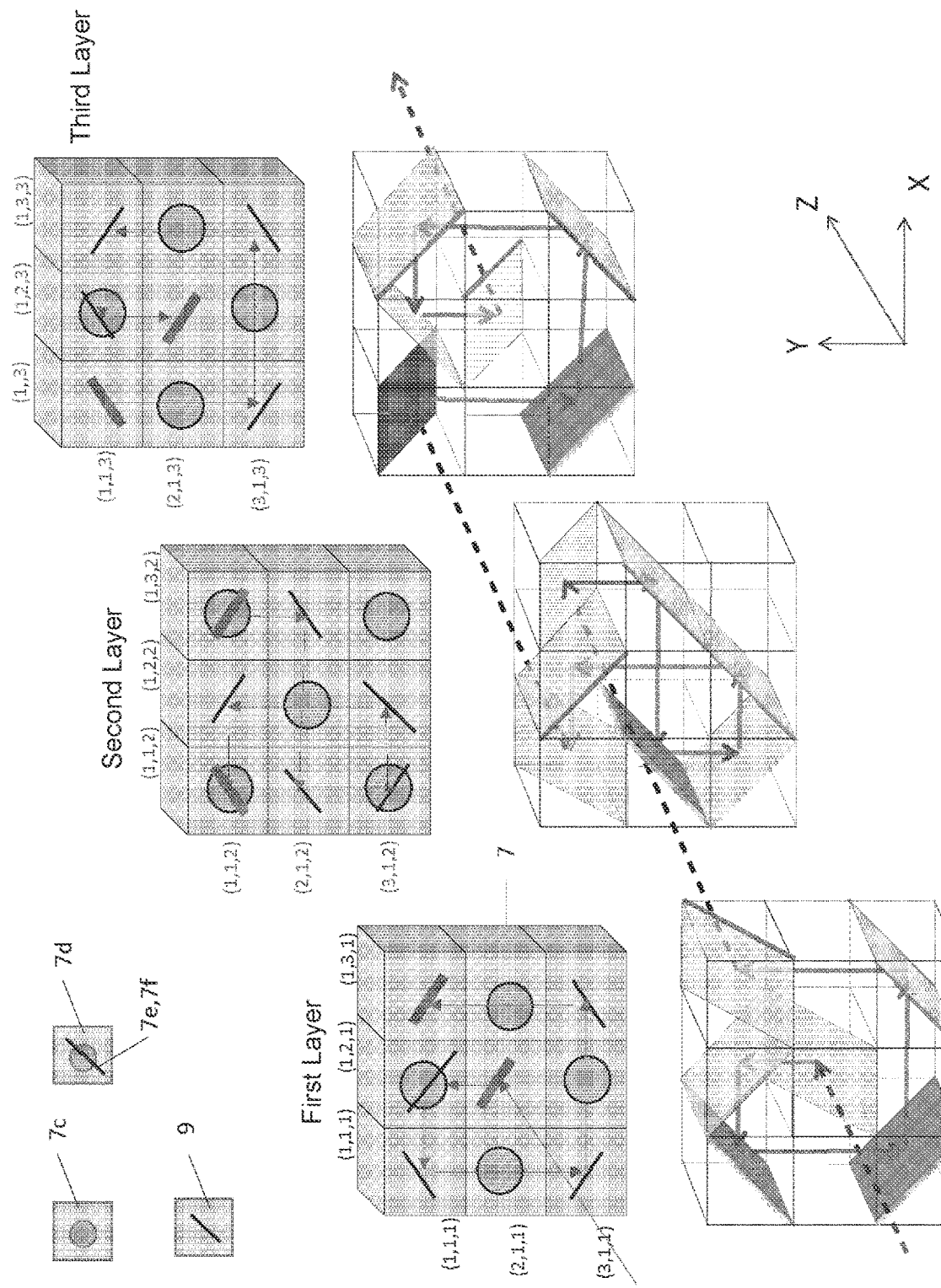
FIG. 24 is an illustration of a structure for creating a compact three-dimensional arrangement of the one-dimensionally arranged 1×N optical beam switching element according to the present invention shown in FIG. 10.

FIG. 24 is one example thereof. This structure is composed, at root, of three elements. These elements are three-dimensionally disposed in an X, Y, Z coordinate system. This example comprises three layers, with the first layer being an input layer, the second layer being an intermediate layer, and the third layer is an output layer. The three elements are a walk-off correction cube 7c constituted by a cube and a focusing polarization grating; a walk-off correction cube 7d constituted by a reflective mirror 7e (correction mirror), a focusing polarization grating, and a corner cube comprising a correction sloped face 7f; and a reflective optical beam switching element 9.

The thick diagonal lines in the first through third layers are elements for directing the optical beam in the Z-axial direction, and are used for input and output and to couple the optical beam between the different layers. It is apparent that the path of the optical beam shown in FIG. 19 is the same as the path as in the transmissive element shown in FIG. 10. Arranging the elements in three dimensions in this manner yields an extremely compact 1×N optical beam switching element.

Figure 25:
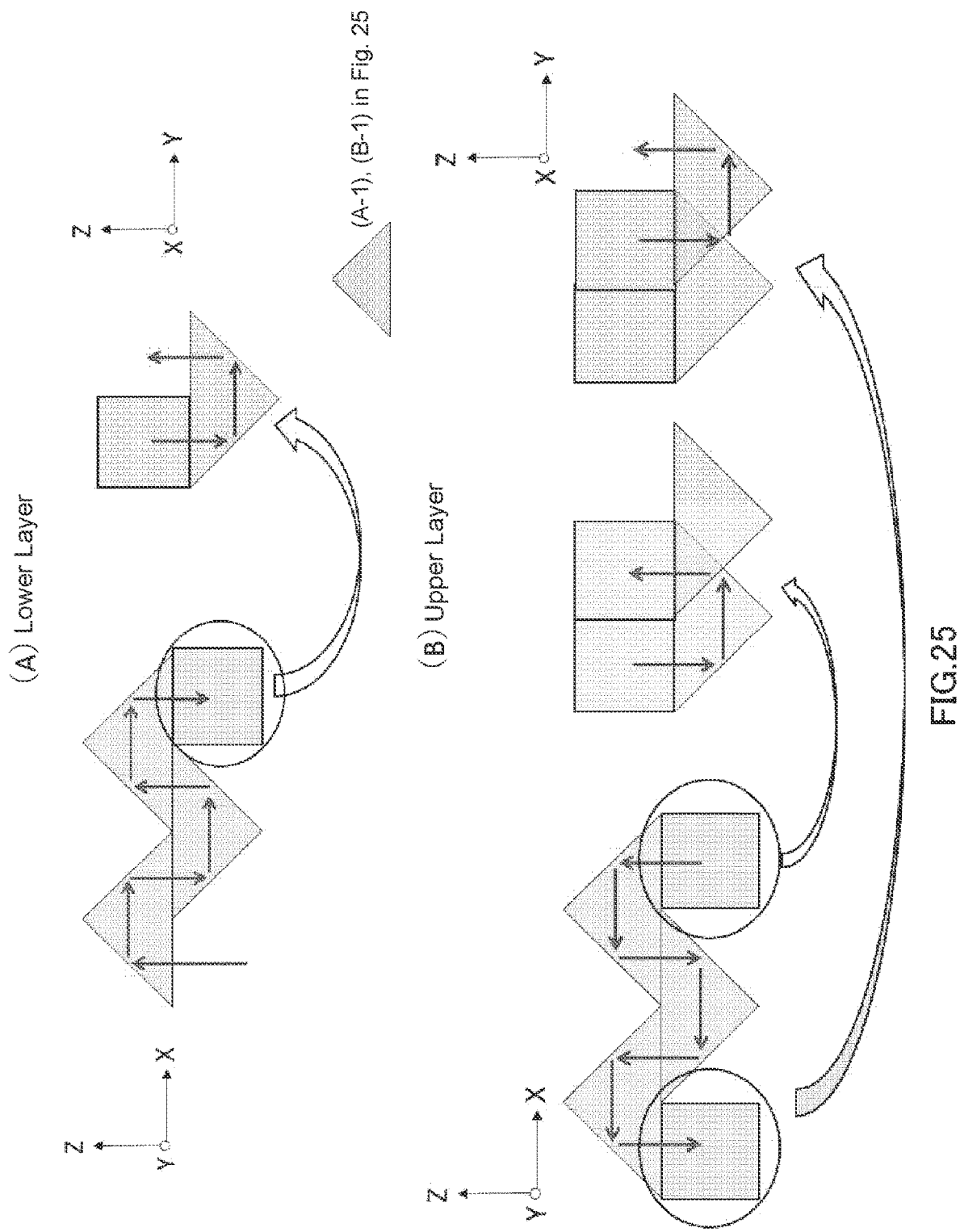
FIGS. 25(A) and (B) are illustrations of an example of a structure for creating a compact three-dimensional arrangement of the 1×N optical beam switching element using the optical beam focusing system shown in FIG. 23.
Figure 26:
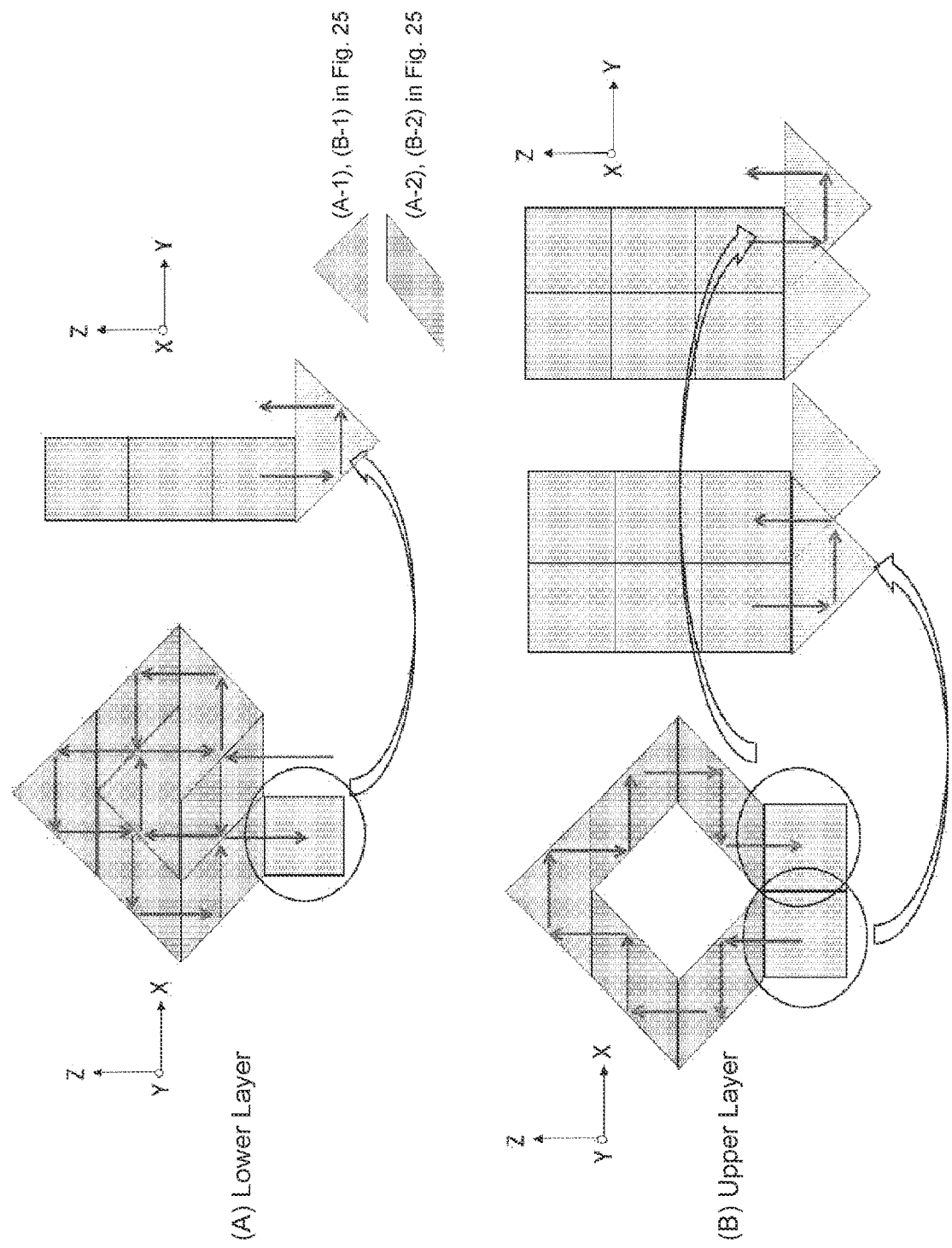
FIGS. 26 (A) and (B) are illustrations of another example of a structure for creating a compact three-dimensional arrangement of the 1×N optical beam switching element using the optical beam focusing system shown in FIG. 23.

FIG. 25 and FIG. 25 show examples of structures in which a 1×N optical beam switching element arranged in one dimension using an optical beam focusing system that utilizes the ordinary convex lenses 50 shown in FIG. 23 is compactly arranged in three dimensions. A compact 1×N optical beam switching element can also be achieved by three-dimensionally arranging various other combinations apart from these.

Example 7

Figure 27:
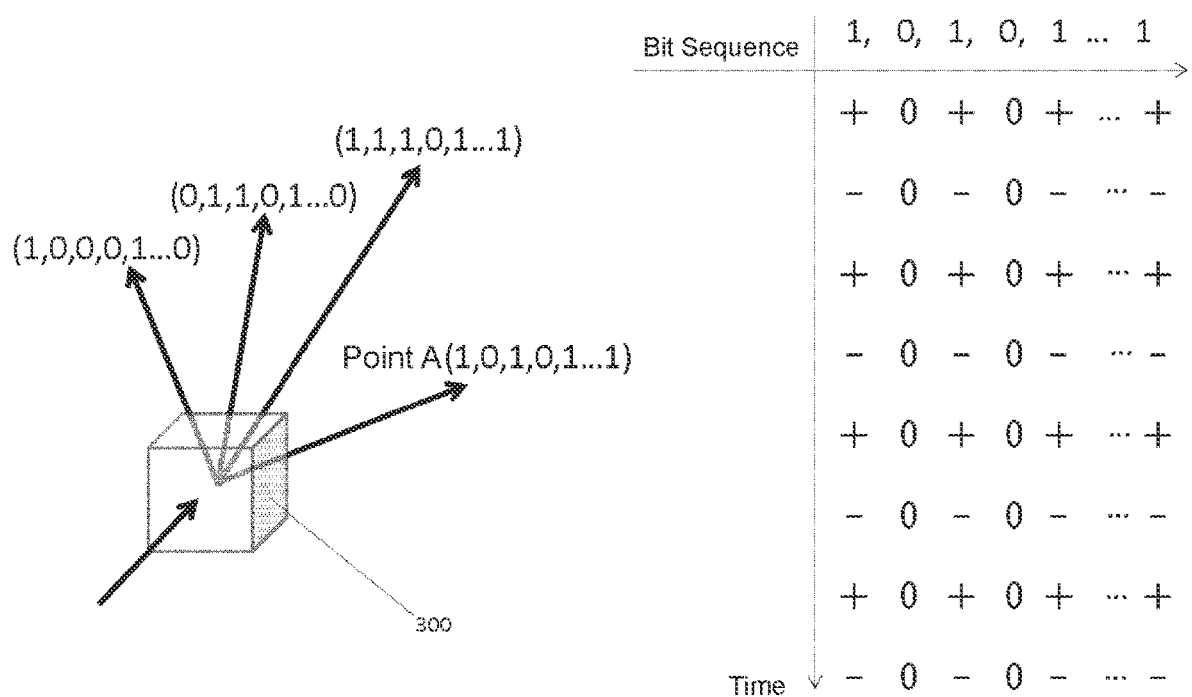
FIG. 27 is an illustration of a method of controlling a 1×N optical beam switching element according to the present invention.

FIG. 27 shows a method of controlling a 1×N optical beam switching element 300 according to the present invention. The 1×N optical beam switching element controls the direction of an optical beam according to whether or not voltage is being applied to the polarization switching elements. In other words, an optical beam deflected by given angles according to a bit sequence in which 1 is voltage on and 0 is voltage off can be achieved.

However, a mixture of numerous ions is present in liquid crystal, and problems such as image persistence occur when the same electric field is applied. Meanwhile, the index of refraction of blue phase liquid crystal varies according to the square of the electric field. Therefore, the same effects can be obtained by alternating the voltage as +, +, . . . , since the application of voltage is expressed using the same bit ("1")

in both cases. In other words, problems such as image persistence can be avoided by constantly performing an inversion process in which the polarity of the voltage is alternately inverted over time.

REFERENCE NUMBERS

1: Corner cube
2: Polarization switching element
3: Mirror
4: Polarization grating
5: Focusing polarization grating
7: Cube
7a: Walk-off correction cube formed from cube
7b: Walk-off correction cube formed from reflective mirror and corner cube
8: Hemispherical lens
9: Reflective optical beam switching element
9': Transmissive optical beam switching element
21: Comb-shaped electrode
22: Polymer-stabilized blue phase liquid crystal
24: Substrate
25: Electrode
26: Blue phase liquid crystal
27: Index ellipsoid
50: Convex lens
100: Circularly polarized polarization diversity
101: Single-mode optical fiber
102: Lens
103: Phase plate
104: Half-wave plate
201: Glass substrate
202: Transparent electrode
203: Blue phase liquid crystal
300: 1×N optical beam switching element

What is claimed is:

1. An optical beam switching element for switching an incoming optical beam, comprising:
    a columnar sloped member made of a light-transmissive material comprising a first planar face, a second planar face orthogonal to the first planar face, and a sloped face that is sloped with respect to the first planar face and the second planar face;
    a polarization switching element, the rear surface of which is mounted to the sloped face;
    a mirror mounted to the front surface of the polarization switching element; and
    a polarization grating mounted to the second planar face,
    wherein the polarization switching element comprises polymer-stabilized blue phase liquid crystal sandwiched between a pair of transparent electrodes, and
    wherein the polarization grating comprises a director that produces birefringence.

2. The optical beam switching element according to claim 1, wherein the polarization grating acts as a half-wave plate upon the incoming optical beam.

3. The optical beam switching element according to claim 1,
    wherein a columnar correction element is mounted to the optical beam switching element, the columnar correction element provided with:
        an element body made of a light-transmissive material, comprising a mounting face mounted to the face on which the polarization grating is mounted, and a light-emitting face that is parallel to the mounting face; and
    a focusing polarization grating having a focusing director that produces birefringence on the light-emitting face to focus light.

4. The optical beam switching element according to claim 3, wherein the focusing polarization grating is formed so that the wavelength of the focusing director is such that the angle of the incoming optical beam and the angle of the outputted optical beam are symmetrical.

5. The optical beam switching element according to claim 3, wherein the focusing director is formed such that it has a wavelength that yields half-wave plate functionality at a reference position, and the period thereof gradually shortens symmetrically outward from the reference position.

6. The optical beam switching element according to claim 1, wherein a non-reflective coating is formed on the faces through which the optical beam passes.

7. The optical beam switching element according to claim 1, wherein the mirror is a multi-layer film dielectric mirror or a metal mirror.

8. An optical beam switching element assembly comprising:
    a first set of optical beam switching elements formed by the optical beam switching element according to claim 3, and
    an $M^{th}$ set of the optical beam switching elements (wherein M is an integer equal to or greater than 2) according to claim 3 coupled to the first set of optical beam switching elements,
    wherein coupling is performed by mounting the first planar face on the coupling side to the light-emitting face on the receiving side, and wherein the assembly is formed so that the wavelength of the director of the $M^{th}$ set of optical beam switching elements is $\frac{1}{2}^{M-1}$ the wavelength of the director of the first set of optical beam switching elements.

9. An optical beam switching element assembly comprising:
    a first set of optical beam switching elements formed by the optical beam switching element according to claim 3, and
    an $M^{th}$ set of the optical beam switching elements (wherein M is an integer equal to or greater than 2) according to claim 3 coupled to the first set of optical beam switching elements,
    wherein coupling is performed by mounting the first planar face on the coupling side to the light-emitting face on the receiving side, and
    wherein the assembly is planarly arrayed in a plane XY in an XYZ coordinate system.

10. An optical beam switching element assembly comprising:
    a first set of optical beam switching elements formed by the optical beam switching element according to claim 3, and
    an $M^{th}$ set of the optical beam switching elements (wherein M is an integer equal to or greater than 2) according to claim 3 coupled to the first set of optical beam switching elements,
    wherein coupling is performed by mounting the first planar face on the coupling side to the light-emitting face on the receiving side, and
    wherein the first set of optical beam switching elements is disposed in a plane XY, and the second set of optical beam switching elements is arrayed in a raised state from plane XY in the Z-direction in an XYZ coordinate system.

11. The optical beam switching element assembly according to claim 8,
wherein the mounting face and the light-emitting face of the correction element are orthogonally disposed,
wherein the element body is provided with a correction sloped face that is sloped with respect to the mounting face and the light-emitting face, and
wherein the focusing polarization grating is mounted to the correction sloped face, and a correction mirror is mounted to the front surface of the focusing polarization grating.

12. The optical beam switching element assembly according to claim 8, wherein lens-type correction elements constituted by a pair of convex lenses with abutting convex surfaces being disposed on the mounting face and the light-emitting face in place of the correction element.

13. The optical beam switching element assembly according to claim 12, wherein the convex lenses are formed in semicylindrical shapes.

14. An optical beam switching element for switching an incoming optical beam comprising:
a columnar sloped member made of a light-transmissive material comprising a first planar face, a second planar face parallel to the first planar face, and a sloped face that is disposed between the first planar face and the second planar face and is sloped with respect to the first planar face and the second planar face;
a polarization switching element mounted to the sloped face;
a polarization grating mounted to the second planar face,
wherein the polarization switching element comprises polymer-stabilized blue phase liquid crystal sandwiched between a pair of transparent electrodes, and
wherein the polarization grating has a director that produces birefringence.

15. The optical beam switching element according to claim 14, wherein the optical beam switching element acts as a half-wave plate upon the incoming optical beam.

16. The optical beam switching element according to claim 14 or 15,
wherein a columnar correction element is mounted to the optical beam switching element, the columnar correction element provided with:
an element body made of a light-transmissive material, comprising a mounting face mounted to the face on which the polarization grating is mounted, and a light-emitting face that is parallel to the mounting face; and
a focusing polarization grating having a focusing director that produces birefringence on the light-emitting face to focus light.

17. A method of controlling the optical beam switching element according to claim 1 or 14 comprising the step of:
performing an inversion process to invert the polarity of the voltage applied to the transparent electrodes is performed.

* * * * *